United States Patent [19]
Tracey

[11] 3,969,674

[45] July 13, 1976

[54] METHOD AND APPARATUS FOR INCOHERENT ADAPTIVE MEAN-SQUARE EQUALIZATION OF DIFFERENTIALLY PHASE-MODULATED DATA SIGNALS

[75] Inventor: Robert J. Tracey, San Mateo, Calif.

[73] Assignee: GTE Automatic Electric Laboratories Incorporated, Northlake, Ill.

[22] Filed: Oct. 21, 1974

[21] Appl. No.: 516,842

[52] U.S. Cl. ............................. 325/42; 179/15 BC; 235/156; 325/65; 325/476
[51] Int. Cl.$^2$ .......................................... H04B 1/10
[58] Field of Search ............... 325/42, 65, 320, 324, 325/325, 326, 473–476; 178/67, 88; 179/15 BC; 235/181, 156

[56] References Cited
UNITED STATES PATENTS

| | | | |
|---|---|---|---|
| 3,581,207 | 5/1971 | Chang | 325/42 |
| 3,757,221 | 9/1973 | Moehrmann | 325/42 |
| 3,875,515 | 4/1975 | Stuart et al. | 325/42 |
| 3,878,468 | 4/1975 | Falconer et al. | 325/42 |

*Primary Examiner*—Felix D. Gruber
*Attorney, Agent, or Firm*—Russell A. Cannon; Leonard R. Cool

[57] ABSTRACT

An incoherent adaptive transversal equalizer for the receiver of a differentially phase-modulated data transmission system wherein a pair of tapped delay lines are located in memory of a digital computer or central processor which performs equalization of a sampled data signal according to the mean-square error algorithm defined by equations (1) - (4). In-phase and quadrature-phase tap gains $c_{-n}$ and $d_{-n}$ are each selectively combined with both the in-phase and quadrature-phase sampled signal component words $A_{k+n}$ and $B_{k+n}$, respectively, at associated tap lines of the delay lines (except the principal or center tap line, where $n = 0$ here) to produce a plurality of weighted tap signals $c_{-n} A_{k+n}$; $-d_{-n} B_{k+n}$; $c_{-n} B_{k+n}$, and $d_{-n} A_{k+n}$. These weighted tap signals and the center tap line signals $A_{k+0}$ and $B_{k+0}$ are selectively combined to produce equalized in-phase and equalized quadrature-phase sampled signal component words $A_k'$ and $B_k'$ that are defined by equations (5) and (6). These equalized component words $A_k'$ and $B_k'$ of a current signal sample are operated on to obtain an indication $\Delta\theta$ of the actual difference between phases of the current ($k^{th}$) and prior ($k-1^{th}$) signal samples. Common error signals $AE_k'$ and $BE_k'$ are produced during a current symbol interval by subtracting the in-phase and quadrature phase components of the $k-1^{th}$ equalized signal sample vector ($A_{k-1}'$, $B_{k-1}'$), after this vector is rotated by the phase angle $\Delta\theta$, from the equalized in-phase and quadrature-phase components $A_k'$ and $B_k'$, respectively, of the current ($k^{th}$) signal sample (see equations (3) and (4)). The products of the in-phase and quadrature-phase sampled signal component words $A_{k+n}$ and $B_{k+n}$ at associated tap lines of the delay lines, except the principal tap lines, where $n = 0$ here, and associated common in-phase and quadrature-phase error signals $AE_k'$ and $BE_k'$, respectively, are combined during a current symbol interval to produce values of the in-phase incremental tap gains $\Delta c_{-n}$ in equation (1). Tap gains $c_{-n}$ (where $n \neq 0$) that are obtained during a prior signal sample are combined during a current symbol interval with the new incremental tap gains $\Delta c_{-n}$ to obtain updated values of tap gains $c_{-n}$ for use during the next symbol interval, a principal tap gain here being the constant $c_o = 1$. Also, the products of these component words $A_{k+n}$ and $B_{k+n}$ at each tap line of the delay lines, except the principal tap, where $n = 0$ here, and associated quadrature-phase and in-phase error signals $BE_k'$ and $AE_k'$, respectively, are combined during a current symbol interval to produce new values of the quadrature-phase incremental tap gains $\Delta d_{-n}$ in equation (2). Tap gains $d_{-n}$ (where $n \neq 0$) that are obtained during a prior signal sample are combined during the current symbol interval with the new incremental tap gains $\Delta d_{-n}$ to obtain updated values of tap gains $d_{-n}$ for use during the next symbol interval, the other principal tap gain here being the constant $d_o = 0$.

30 Claims, 28 Drawing Figures

MSB1

MSB2

LSB = MSB3

| | 1 | 2 | 3 | 4 | 5 | 6 |
|---|---|---|---|---|---|---|
| | RANGE OF RECEIVED $\Delta\phi'_k$ | | QUANTIZED $\Delta\phi'_k = \Delta\theta$ | $\Delta\theta$ | SIN $\Delta\theta$ | COS $\Delta\theta$ |
| | $\geq$ | $<$ | | | | |
| 1 | +135° | +180° | +157.5° (+22.5°) | 011 | +.383 | −.925 |
| 2 | +90° | +135° | +112.5° (+67.5°) | 010 | +.925 | −.383 |
| 3 | +45° | +90° | +67.5° | 001 | +.925 | +.383 |
| 4 | 0° | +45° | +22.5° | 000 | +.383 | +.925 |
| 5 | −45° | 0° | −22.5° | 111 | −.383 | +.925 |
| 6 | −90° | −45° | −67.5° | 110 | −.925 | +.383 |
| 7 | −135° | −90° | −112.5° (−67.5°) | 101 | −.925 | −.383 |
| 8 | −180° | −135° | −157.5° (−22.5°) | 100 | −.383 | −.925 |

(TABLE I)

FIG. 22

| 1 | 2 | 3 | 4 | 5 |
|---|---|---|---|---|
| OCTANT | POLARITY $A'_k + B'_k$ | POLARITY $A'_k - B'_k$ | POLARITY OF $A'_k$ OR $B'_k$ | CORRECTION REQUIRED |
| 1 | + | + | $B'_k$ + | NONE, ie $TAN^{-1}\left|\frac{B'_k}{A'_k}\right|$ |
| 2 | + | − | $A'_k$ + | $90° - TAN^{-1}\left|\frac{A'_k}{B'_k}\right|$ |
| 3 | + | − | $A'_k$ − | $90° + TAN^{-1}\left|\frac{A'_k}{B'_k}\right|$ |
| 4 | − | − | $B'_k$ + | $180° - TAN^{-1}\left|\frac{B'_k}{A'_k}\right|$ |
| 5 | − | − | $B'_k$ − | $180° + TAN^{-1}\left|\frac{B'_k}{A'_k}\right|$ |
| 6 | − | + | $A'_k$ − | $270° - TAN^{-1}\left|\frac{A'_k}{B'_k}\right|$ |
| 7 | − | + | $A'_k$ + | $270° + TAN^{-1}\left|\frac{A'_k}{B'_k}\right|$ |
| 8 | + | + | $B'_k$ − | $0° - TAN^{-1}\left|\frac{B'_k}{A'_k}\right|$ |
| FIG.20 | +, − | ⊕, ⊖ | A±, B± | |

(TABLE II)

FIG. 23

METHOD AND APPARATUS FOR INCOHERENT ADAPTIVE MEAN-SQUARE EQUALIZATION OF DIFFERENTIALLY PHASE-MODULATED DATA SIGNALS

BACKGROUND OF INVENTION

This invention relates to adaptive equalizers, and more particularly to method annd apparatus providing incoherent adaptive equalization in accordance with a novel mean-square error algorithm to correct for distorting effects of a transmission channel of limited bandwidth on differentially phase-modulated data signals.

Distortion that is caused by a transmission channel is essentially any difference between an original wave shape and the wave shape after the wave has traversed the transmission channel. An equalizer is a circuit that reduces or compensates for distortions that are introduced onto a signal that is passed in a communication channel of limited bandwidth. Equalization is accomplished by introducing networks which add compensating attenuation and/or time delay at various frequencies in the transmission band of the communication channel such that the resultant composite characteristic of the signal components passed thereby is substantially constant in amplitude and linear in phase over the channel bandwidth.

Four-phase differential-phase modulation techniques are particularly effective and reliable for transmitting data at 2400 bits per second over voice-band channels, although eight-phase differential phase modulation techniques may be preferable in certain instances. At this moderate data rate, a fixed equalizer generally provides adequate compensation for distortion that is introduced in data signals by a typical voice channel. Four-phase differential-phase modulation techniques in which successive signals are encoded in dibit pairs so that a signal can be transmitted at only half its generating rate are described in U.S. Pat. No. 3,128,342, Apr. 7, 1964, Phase Modulation Transmitter by Paul A. Baker; Pat. No. 3,128,343, Apr. 7, 1964, Data Communication System by Paul A. Baker; and the book entitled Data Transmission by W. R. Bennet and J. R. Davey, McGraw Hill Book Company, copyright 1965, chapter 10. A four-phase differential-phase modulation data transmission system employing such a technique is described in relation to a coherent adaptive transversal equalizer in U.S. Pat. No. 3,755,738, Aug. 28, 1973, Passband Equalizer for Phase-Modulated Data Signals by R. D. Gitlin, et al. Data systems for operation at higher data rates, such as 4800 bits per second, generally employ eight-phase differential-phase modulation techniques and require adaptive equalizers to provide adequate equalization. Another prior-art adaptive transversal equalizer is described in relation to eight-phase differential-phase modulation signals in U.S. Pat. No. 3,727,136, Apr. 10, 1973, Automatic Equalizer for Phase Modulation Data Transmission Systems by Schroeder et al.

U.S. Pat. No. 3,727,136 discloses an incoherent adaptive equalizer that operates according to a zero-forcing algorithm. In '136, a differentially coherent phase-modulated data signal is equalized in a tapped delay line transversal equalizer in which error signals are derived from the departure of phase-angle changes between both adjacent and nonadjacent samples from predetermined discrete values in accordance with a zero-forcing algorithm. The delayed tap signals in the equalizer are selectively attenuated by separate sets of in-phase and quadrature-phase weighting attenuators whose outputs are combined in quadrature to form the equalized signal. In order to obtain phase angle differences between nonadjacent signal samples, it is necessary to provide storage for a plurality of consecutively measured phase changes so that leading and lagging distortions associated with the various signal samples can be compensated. In effect, an independent error signal must be provided for each tap of the equalizer.

U.S. Pat. No. 3,755,738 discloses a coherent adaptive equalizer which operates according to a mean-square error algorithm. In '738 a four-phase differentially coherent phase-modulated data signal is equalized in a tapped delay line transversal equalizer in which a common error control signal for adjusting both in-phase and quadrature-phase attenuators is derived from the mean-square error difference between the quadrature-phase equalized signal and a predetermined threshold level that is based on an assumed absolute phase-reference angle at the equalizer output. This equalizer employs an absolute phase-reference angle and is therefore particularly susceptible to error in response to phase jitter. Since the reference remains fixed, any phase jitter results in error. Also, an absolute reference is difficult to obtain since it must be learned. Frequency offset must be learned, so response to instantaneous offset is a source for error.

An object of this invention is the provision of an improved adaptive equalizer.

SUMMARY OF INVENTION

In accordance with a preferred embodiment of this invention, equalization of digital representations of in-phase and quadrature-phase components $A_{k+n}$ and $B_{k+n}$, respectively, of current ($k^{th}$) samples of a received data signal is accomplished in a central processing unit or digital computer including a pair of tapped delay lines in memory. Equalization is performed according to the novel mean-square error algorithm that is defined by equations (1) – (4), where the terms thereof are generally defined in the Glossary. In particular, the subscript $k$ designates a sampled signal and the subscript $n$, having values of $+x$ to $-x$, designates a particular signal sample $x$ such that $A_{k+x}$ represents the in-phase component of a current ($k^{th}$) signal sample at the first input tap line of a delay line. The processor produces current equalized in-phase and quadrature-phase components $A'_k$ and $B'_k$ of a current ($k^{th}$) signal sample which are defined by associated equations (5) and (6), using values of tap gains $c_{-n}$ and $d_{-n}$ that are computed in a prior symbol interval. Updated in-phase and quadrature-phase tap gains $c_{-n}$ and $d_{-n}$ produced during a current ($k^{th}$) signal sample are the values thereof for the prior ($k^{-th}$) sample plus the new incremental tap gains $\Delta c_{-n}$ and $\Delta d_{-n}$ that are defined by equations (1) and (2) B2 in-phase and quadrature-phase error signals $AE'_k$ and $BE'_k$ that are produced by the processor during the current ($k^{th}$) signal samples are defined by equations (3) and (4), where the terms $A'_k$ and $B'_k$ are the current ($k^{th}$) values of the equalized signal; the terms $A'_{k-1}$ and $B'_{k-1}$ representing equalized in-phase and equalized quadrature-phase components of the prior ($k-1^{th}$) signal sample; and the angle $\Delta\theta$ being the quantized value of the difference $\Delta\phi'_k = \phi'_k - \phi'_{k-1}$ between the phases of received data signal samples produced during the current ($k^{th}$) and prior ($k-1^{th}$) symbol intervals. During equalization of signals at baseband frequencies, $\Delta\theta$ must be adjusted to include the carrier term $\omega_c T$. Thus, the new error signal $AE'_k$ is a measure of the difference between the equalized component $A'_k$ of a current ($k^{th}$) in-phase signal sample and the in-phase component of the $k-1^{th}$ equalized signal sample vector ($A'_{k-1}$, $B'_{k-1}$) after this vector is rotated by the quantized phase angle $\Delta\theta$. Similarly, the new error signal $BE'_k$ is the difference between the equalized component $B'_k$ of a current ($k^{th}$) signal sample and the quadrature phase component of the $k-1^{th}$ equalized signal sample vector ($A'_{k-1}$, $B'_{k-1}$) after the latter is rotated by the quantized phase angle $\Delta\theta$. In this manner, the equalized signal samples are independent of any fixed phase reference. Baseband and passband versions, as well as analog and digital implementations, of this invention are also disclosed.

DESCRIPTION OF DRAWINGS

This invention will be more fully understood from the following detailed description, together with the drawings wherein:

FIG. 22 shows Table I which is a summary of information related to phase angles in FIG. 2 and which is useful in explaining the operation of this invention; and FIG. 23 shows Table II which summarizes the operation of the program in FIGS. 17A and 17B.

Similar elements in the various figures and embodiments of this invention are identified by the same or primed reference numbers, or the same reference numeral associated with different letters.

GLOSSARY

Figure 1:
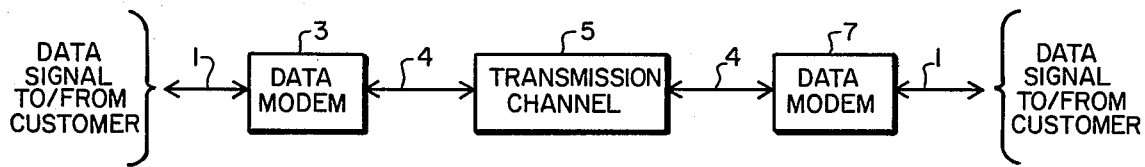
FIG. 1 is a schematic block diagram of a differentially encoded phase modulation data transmission system.

| | | |
|---|---|---|
| t | : | is time |
| T | : | is the sample or symbol interval |
| n | : | is a subscript having values + x to − x for designating a signal sample at a delay line tap line x such that $A_{k+x}$ represents the in-phase component of a current ($k^{th}$) signal sample at the first or input tap line of a tapped delay line. |
| k | : | is a subscript designating a sampled signal. |
| K | : | is a constant. |
| $\omega_c$ | : | is the carrier radian frequency of a data signal. |
| A, B | : | represent in-phase and quadrature-phase components of a data signal. |
| A(t), B(t) | : | are time-varying in-phase and quadrature-phase components of a data signal. |
| $A_k$, $B_k$ | : | are in-phase and quadrature-phase components of the current ($k^{th}$) sample of a received data signal. |
| $A_{k-1}$, $B_{k-1}$ | : | are in-phase and quadrature-phase components of the prior ($k-1^{th}$) sample of a received data signal. |
| $A'_k$, $B'_k$ | : | are equalized in-phase and quadrature-phase components of the current ($k^{th}$) sample of the received data signal. |
| $A'_{k-1}$, $B'_{k-1}$ | : | are equalized in-phase and quadrature-phase components of the prior ($k-1^{th}$) sample of the received data signal. |
| $A_{k+n}$, $B_{k+n}$ | : | are in-phase and quadrature-phase components of a signal sample occurring at the $n^{th}$ tap line of associated tapped delay lines. |
| $A_n$, $B_n$ | : | are the same as $A_{k+n}$, $B_{k+n}$ with the subscript k omitted in the program flow chart. |
| $c_{-n}$, $d_{-n}$ | : | are the in-phase and quadrature-phase tap gains at the tap lines −n of associated tapped delay lines. |
| $\Delta c_{-n}$, $\Delta d_{-n}$ | : | are the incremental in-phase and quadrature-phase tap gains at the tap lines −n of associated tapped delay lines. |
| $AE'_k$, $BE'_k$ | : | are the in-phase and quadrature-phase error signals, where $AE'_k$ for example is a comparison of the equalized in-phase component $A'_k$ of a current ($k^{th}$) signal sample with a reference which is the in-phase component of the |

GLOSSARY

|  |  |  |
|---|---|---|
|  | : | $k-1^{th}$ equalized signal sample vector $(A'_{k-1}, B'_{k-1})$ after the latter is rotated by a phase angle $\Delta\Theta$. |
| $\phi'_k$ | : | is the phase angle of a current ($k^{th}$) equalized signal sample. |
| $\phi'_{k-1}$ | : | is the phase angle of a prior ($k-1^{th}$) equalized signal sample. |
| $\Delta\phi'_k$ | : | is equal to $\phi'_k - \phi'_{k-1}$ and is the actual difference between the phase angles of the $k^{th}$ and $k-1^{th}$ equalized signal samples. |
| $\Delta\Theta$ | : | is the quantized value of $\Delta\phi'_k$. |
| MSB | : | most significant bit. |
| LSB | : | least significant bit. |
| RAM | : | random access memory. |
| ROM | : | read-only memory. |
| ACC | : | accumulator. |
| Act | : | designates the memory location $A_n$ that is defined by the $A_n$ address word whose 3 LSB's correspond to the contents of the index register. |
| Bct | : | similar to Act for memory location and address word $B_n$. |
| Cct | : | similar to Act for memory location and address word $C_n$. |
| Dct | : | similar to Act for memory location and address word $D_n$. |
| TADD | : | two's complement addition. |
| TSUB | : | two's complement subtraction. |
| MPY | : | multiply. |

DESCRIPTION OF PREFERRED EMBODIMENTS

The data system illustrated in FIG. 1 generally comprises a pair of eight-phase differentially encoded phase modulation data sets or modems 3 and 7 which are interconnected by a transmission channel 5. Each data set receives on line 1 raw input data that is to be encoded and transmitted, transmits encoded data on line 4, receives encoded data on line 4, and outputs decoded data on line 1. The transmission channel 5 is normally a band-limited transmission channel such as a voice-band telephone circuit.

Figure 2:
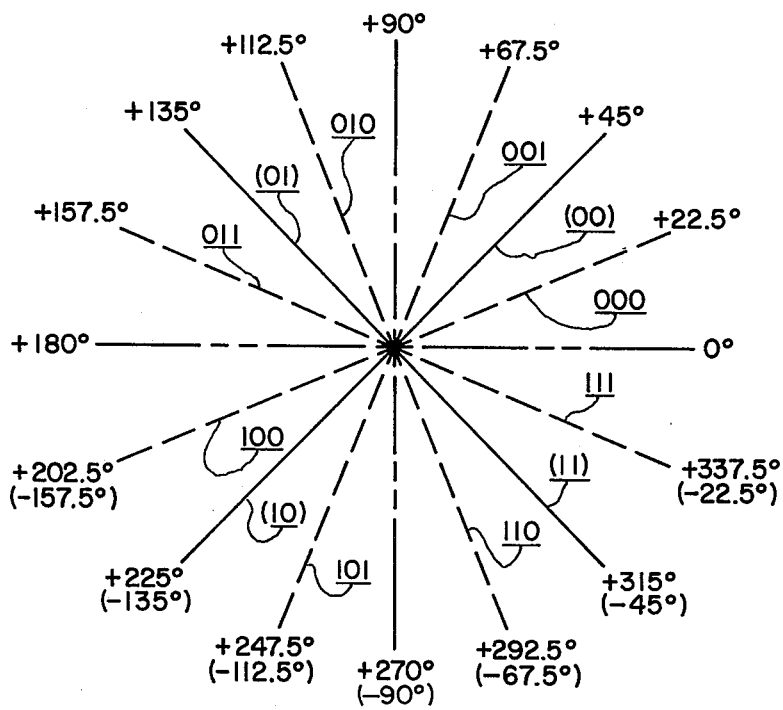
FIG. 2 is a phase vector representation of signal encoding employed in 4-phase and 8-phase differentially encoded phase modulation data transmission systems.

Differential encoding and phase modulation are described in detail in the aforementioned references and will be only briefly discussed here. In a four-phase differential-phase modulation system, serial data bits for transmission are paired into dibits (two adjacent bits of input data) that are encoded according to a scheme such as that illustrated in FIG. 2 by solid lines, with associated dibit words in parentheses. The dibits 00 and 11 are encoded as + and − 45°, whereas the dibits 01 and 10 are encoded as + and − 135°. These dibit words are applied to logic circuitry which causes discrete changes in the phase of a carrier wave to be generated in odd multiples of 45 electrical degrees. The existing carrier phase is taken as a reference phase in each case. The difference between the phase of the carrier wave during the current and prior symbol intervals corresponds to the current dibit.

Figure 3A:
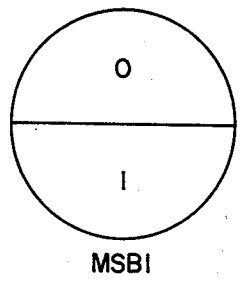
FIGS. 3A, 3B, and 3C are graphic representations of ranges of phase angle designated by the first and second MSB's and the LSB in the 3-bit digital words in FIG. 2.
Figure 3B:
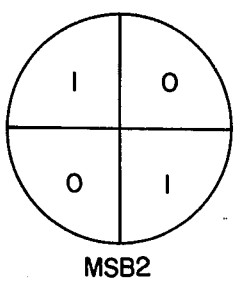
Figure 3C:
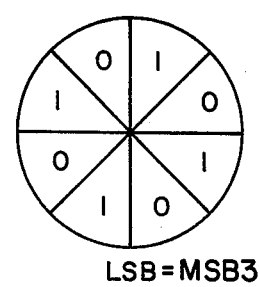

Eight-phase modulation is similar to four-phase modulation. In an eight-phase differential-phase modulation system, serial data bits for transmission are arranged in successive groups of three different serial bits. Each group of three distinct bits is taken at an instant of time as a tribit and is encoded according to a scheme as that illustrated in FIG. 2 by broken lines (not the phantom lines at 0° and 90°), with associated tribit words being the associated 3-bit words. In the coding scheme in FIG. 2, the tribits 000 and 111 are encoded as + and −22.5°; tribits 001 and 110 as + and −67.5°; the tribits 010 and 101 as + and −112.5°; and, tribits 011 and 100 as 30 and −157.5°. The tribit words are applied to logic circuitry which causes discrete changes in the phase of the carrier wave. The carrier is generated in odd multiples of 22.5°. The existing phase is again taken as a reference phase. A phase change occurs here in each symbol interval since the tribit 000 is encoded as + 22.5° rather than 0°, although such a condition is not a necessity. Although the absolute phase of the carrier wave during any symbol or tribit interval may be an odd or an even multiple of 22.5°, the phase difference between the phases of the carrier waves in a current tribit symbol interval and the prior tribit symbol interval is required to be an odd multiple of 22.5° since this phase difference corresponds to the current tribit. The 3-bit digital words in FIG. 2 define phase angles which occur at 22.5° intervals and which are useful in quantizing phase angles of any value into phase angles in this example that are the closest odd multiples of 22.5° as will be described more fully hereinafter. The circles in FIGS. 3A – 3C are graphic representations of the decreasing ranges of phase angles that are defined by the first, second, and third MSB's, respectively, of these 3-bit digital words. By way of example, if the first MSB of a 3-bit word defining a phase angle is a 0 or 1, the phase angle is between 0° and 180° or between 180° and 360°, as is shown in FIG. 3A. The first and second MSB's together designate the quadrant containing the phase angle. Finally, all three bits together designate the octant containing the phase angle.

In an eight-phase differential-phase modulation system and equalizer that was built and tested, the carrier frequency was 1800 Hz and the symbol or tribit rate was 1600 samples per second. Since there are three bits of data for each symbol, this system had a data speed of 4800 bits per second. Each symbol interval included 9/8 cycles of carrier signal, prior to phase modulation.

Figure 4:
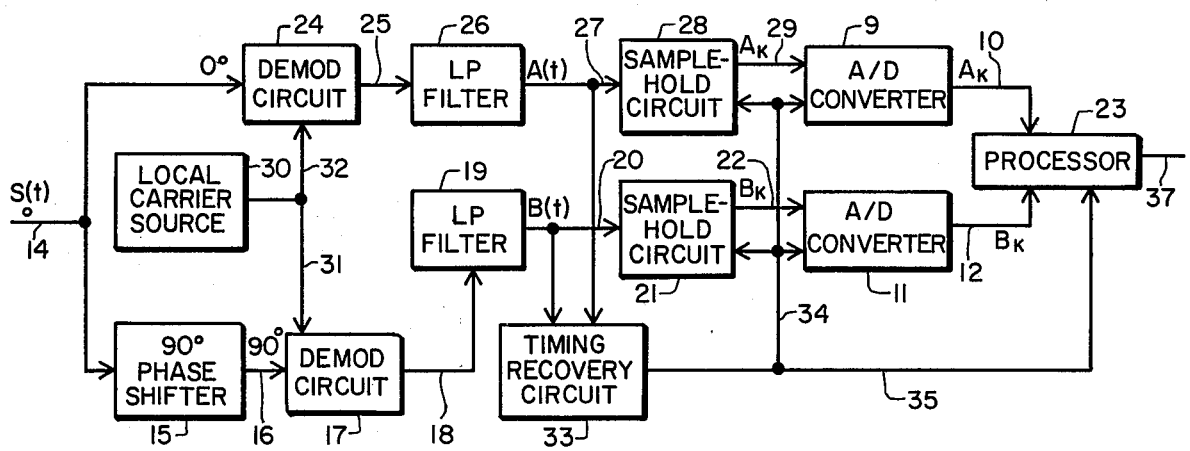
FIG. 4 is a schematic block diagram of the receiver section of a data modem for producing digital sampled signal component words.
Figure 5:
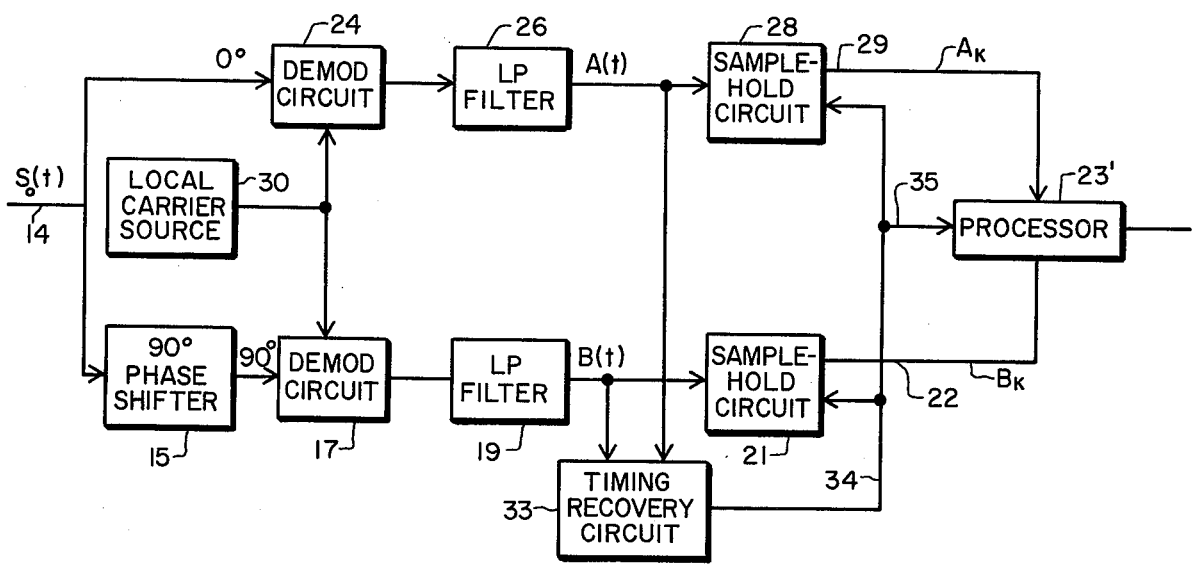
FIG. 5 is a schematic diagram of the receiver portion of a data modem for producing analog baseband sampled component signals.
Figure 6:
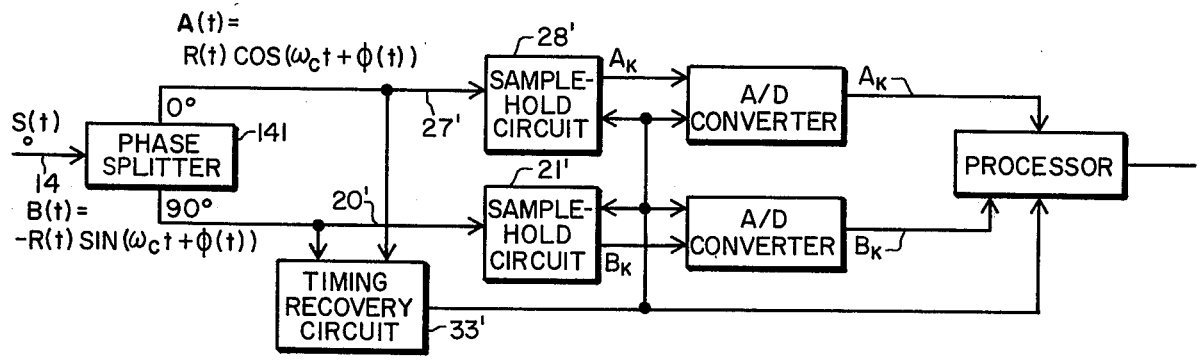
FIG. 6 is a schematic block diagram of the receiver portion of a data modem for producing digital passband sampled signal component words.
Figure 7:
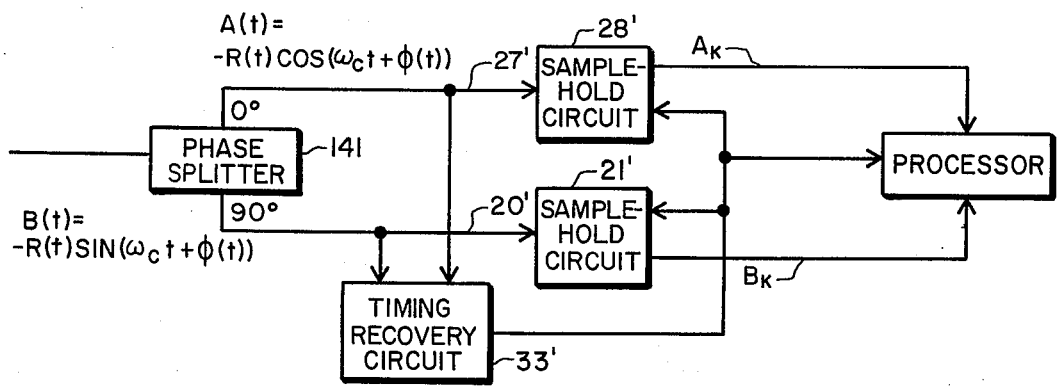
FIG. 7 is a schematic block diagram of the receiver portion of a data modem for producing analog passband sampled component signals.

FIG. 4 is a block diagram of a typical receiver portion of a data modem where the receiver produces digital baseband samples on lines 10 and 12 of received data signals which are preferably processed on a digital basis. A similar receiver producing baseband samples of received data signals for processing on an analog basis is illustrated in FIG. 5. The receivers in FIGS. 4 and 5 are identical except for the processors and the former includes a pair of analog-to-digital (A/D) converters 9 and 11. The passband receivers illustrated in FIGS. 6 and 7 are similar to the baseband receivers in FIGS. 4 and 5, respectively. The receivers in FIGS. 4 – 7 are similar and conventional in the prior art, except for the processors, and these parts thereof will therefore be only briefly described here.

The receiver in FIG. 4 comprises a phase shifter 15 which shifts the phase of the received data signal $S_o(t)$ on line 14 by 90° over the band of interest; a demodulation circuit 17, lowpass filter circuit 19, sample-and-hold circuit 21, and the A/D converter 11, which are connected in series between the output line 16 of the phase shifter and the input line 12 to processor 23; and a demodulator circuit 24, lowpass filter 26, sample-and-hold circuit 28, and the A/D converter 9, which are connected in series between the input line 14 and the input line 10 to processor 23. The received data signal $S_o(t)$ on line 14 is normally distorted by transmission over the band-limited voiceband telephone channel 5 in FIG. 1. This received data signal on line 14 has a constant carrier frequency $\omega_c$ whose phase changes between synchronous data or symbol intervals by odd multiples of 22.5°. A local carrier source 30 produces signals on lines 31 and 32 having the same carrier frequency $\omega_c$ as does the received signal. The demodulators 17 and 24 combine the in-phase and delayed data signals on lines 16 and 14 with the local carrier signals on lines 31 and 32 for producing DC-baseband and product frequency signal components on lines 18 and 25. Only the DC-baseband signal components are passed by the lowpass filters 19 and 26 to produce time-varying in-phase and quadrature-phase baseband component signals $A(t)$ and $B(t)$, respectively, of the received data signal. Timing information is derived from these baseband component signals $A(t)$ and $B(t)$ by a timing recovery circuit 33 which may comprise a high Q bandpass filter tuned to the symbol rate to obtain the correct clock phase. The derived timing signal is applied on line 34 to sample-and-hold circuits 21 and 28 and to the A/D converters 9 and 11 and on line 35 to processor 23 for controlling the operation thereof in a manner that is well known in the art. The time-varying signal components $A(t)$ and $B(t)$ are sampled by circuits 21 and 28 at the center of each symbol interval to produce the analog samples signal components $A_k$ and $B_k$ on lines 22 and 29, respectively, which are maintained constant for the subsequent time interval T that is equal to the symbol interval. Converters 9 and 11 produce digital representations of the signal components $A_k$ and $B_k$ on lines 10 and 12. Since the data signal vectors transmitted over the transmission channel 5 may be altered in amplitude and/or phase such that the pulse shapes thereof are distorted, processor 23 equalizes the in-phase aand quadrature-phase sampled signal component words $A_k$ and $B_k$ prior to decoding them for reproducing the original data on the output line 37.

Figure 8:
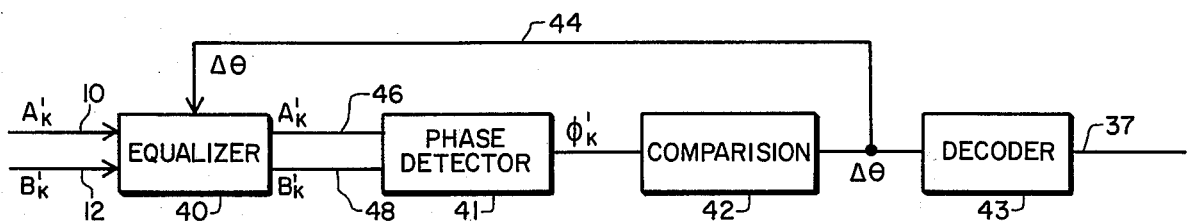
FIG. 8 is a schematic block diagram of the processor in FIG. 4.

Referring now to FIG. 8, a digital processor 23 generally comprises the series combination of an equalizer circuit 40, phase detector circuit 41, comparison circuit 42, and decoder circuit 43. The equalizer 40 is responsive to the current ($k^{th}$) in-phase and quadrature-phase signal samples $A_k$ and $B_k$ on lines 10 and 12 and a measure of the phase difference $\Delta\theta$ between the phase angles of the present ($k^{th}$) signal sample and the prior ($k\text{-}1^{th}$) signal sample for producing equalized in-phase and quadrature-phase sampled signal component words $A'_k$ and $B'_k$ on lines 46 and 48, respectively. Detector circuit 41 is responsive to these equalized component words $A'_k$ and $B'_k$ for producing an indication $\phi'_k$ of the phase of the present ($k^{th}$) signal sample. This indication $\phi'_k$ is compared in circuit 42 with a stored indication $\phi'_{k-1}$ of the phase of the prior ($k\text{-}1^{th}$) signal sample to produce the phase difference $\Delta\phi'_k$ which is then quantized to a phase angle $\Delta\phi$. This quantized phase angle is the actual phase difference $\Delta\phi'_k$ rounded off to an odd multiple of 22.5° as is described more fully hereinafter. The decoder operates on the quantized phase angle $\Delta\theta$ to reproduce the transmitted data on line 37.

Figure 9:
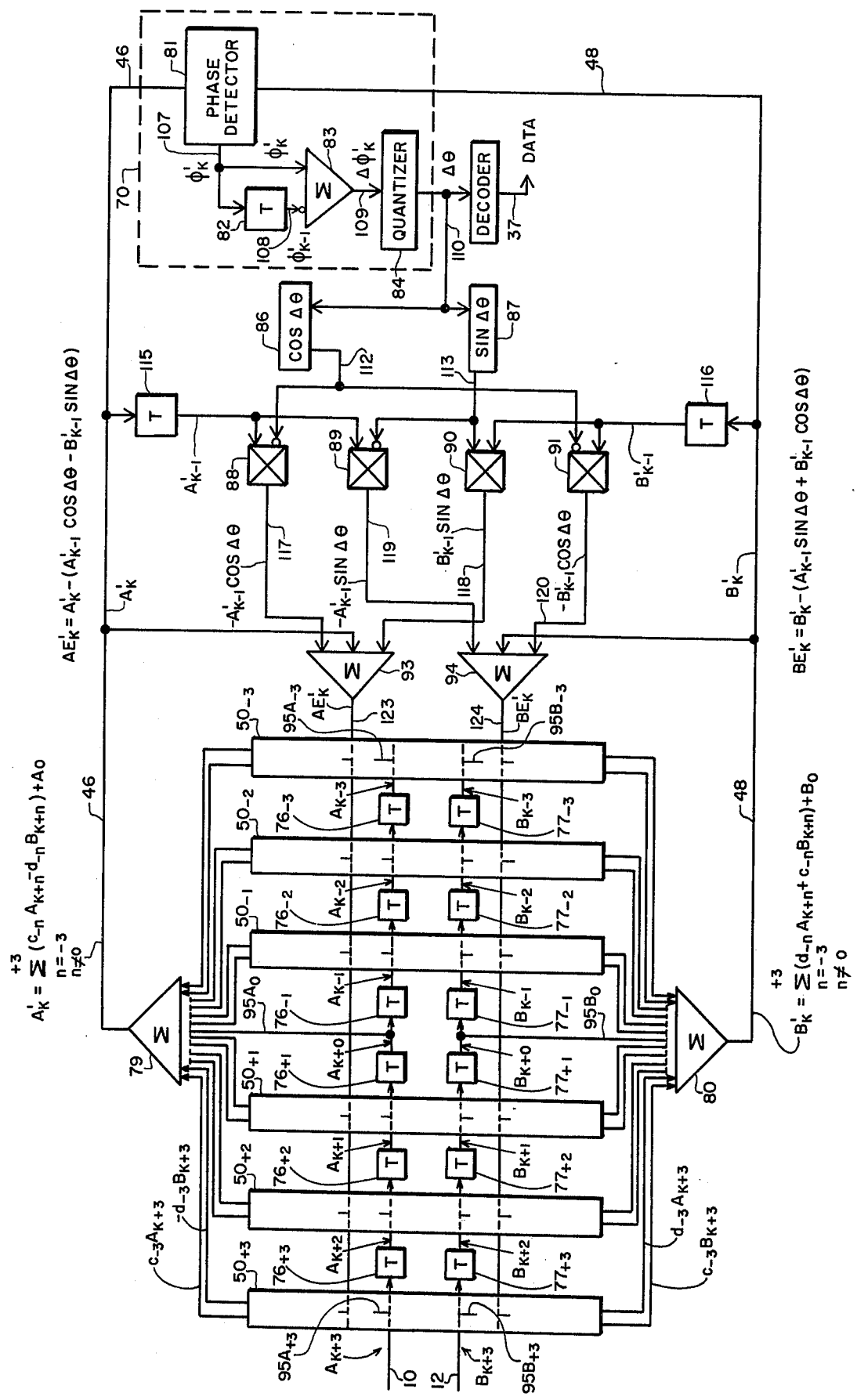
FIG. 9 is a schematic block diagram of the equalizer in FIG. 8.

FIG. 9 is a schematic block diagram of an incoherent equalizer 40 which is implemented with digital circuitry. Each of the $2n$ tap gain control circuits $50_n$ is similar to the circuit $50+_3$ that is shown in detail in FIG. 10. An analog implementation of an equalization system that is functionally equalivent to that illustrated in FIGS. 9 and 10 was also successfully built and tested. A generalized schematic block diagram of the equalizer in FIG. 9 is shown in FIG. 11 where similar elements in the equalizer are functionally represented as a signal circuit. The equalizer in FIGS. 9 – 11 operates in accordance with the algorithm $$\Delta c_{-n} = -2^k(A_{k+n} AE'_k + B_{k+n} BE'_k), n \neq 0 \quad (1)$$

$$\Delta d_{-n} = -2^k (A_{k+n} BE'_k - B_{k+n} AE'_k), n \neq 0 \quad (2)$$

$$AE'_k = A'_k - [A'_{k-1} \cos(\Delta\theta) - B'_{k-1} \sin(\Delta\theta)] \quad (3)$$

$$BE'_k = B'_k - [A'_{k-1} \sin(\Delta\theta) + B'_{k-1} \cos(\Delta\theta)] \quad (4)$$

where terms employed in the equations are defined in the glossary. The derivation of these equations and theoretical analysis of an equalizer implementing this algorithm is found in the paper "An Incoherent Adaptive Mean-Square Equalizer" by R. J. Tracey, IEEE 1974 International Conference on Communications, June 17 – 19, 1974, Conference Record, pages 9F1–9F5. The equalizer output is $$A'_k = \Sigma_n (c_{-n} A_{k+n} - d_{-n} B_{k+n}), c_o = 1, d_o = 0 \quad (5)$$

and $$B'_k = \Sigma_n (d_{-n} A_{k+n} + c_{-n} B_{k+n}), c_o = 1, d_o = 0 \quad (6)$$

where $A'_k$ is the in-phase component word and $B'_k$ is the quadrature-phase component word. The formulae adjacent lines in FIGS. 9 – 11 define different input and output signals at various points thereof.

Figure 10:
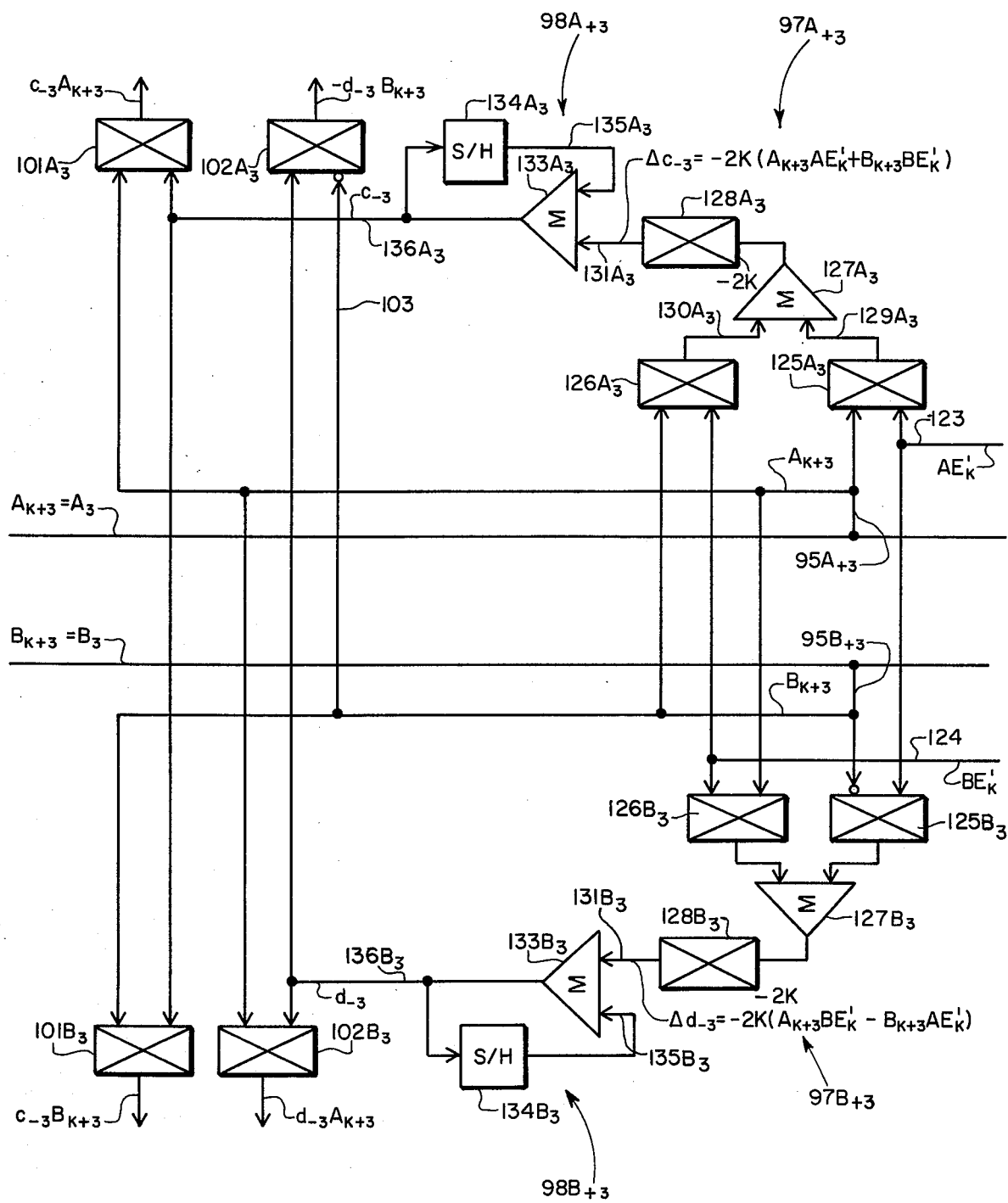
FIG. 10 is a schematic block diagram of the tap gain control circuit in FIG. 9.
Figure 11:
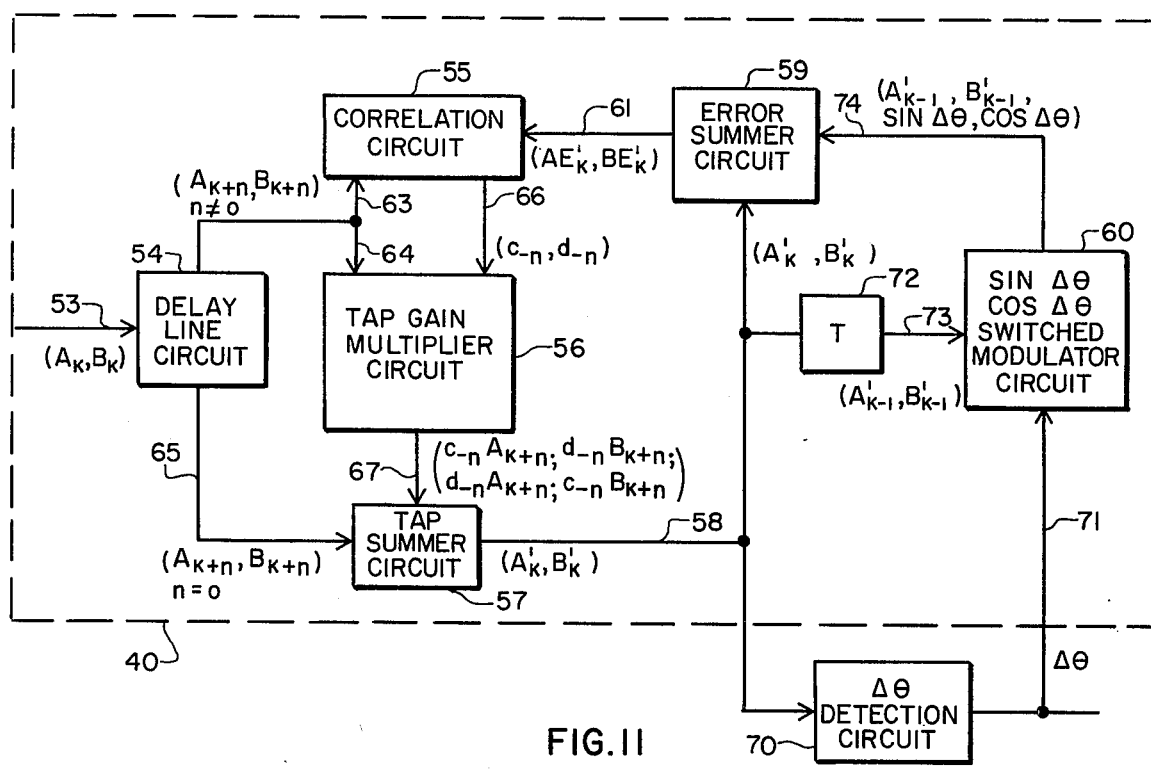
FIG. 11 is a generalized schematic block diagram of the equalizer in FIG. 9.

Equations (1) and (2) define the incremental tap gains $\Delta c_{-n}$ and $\Delta d_{-n}$ on lines $131A_n$ and $131B_n$ of FIG. 10, where $n = +3$, that are employed to adjust the tap gains $c_{++n}$, $d_{-+n}$ on lines $135A_n$ and $135B_n$ of FIG. 10, which in turn are used to obtain weighted tap signals that are selectively combined in circuits 79 and 80 of FIG. 9 to provide the equalized signal components $A'_k$ and $B'_k$ in equations (5) and (6) on line 46 and 48 of FIG. 9. These signal components $A'_k$ and $B'_k$ are employed to produce a phase angle $\Delta\theta$ on line 110 of FIG. 9 which is the quantized value of the difference between the actual data phase angles present in the $k^{th}$ and $k\text{-}1^{th}$ symbol intervals. It will be noted in equations (1) and (2) that common in-phase and quadrature-phase error signals $AE'_k$ and $BE'_k$ are applied to each of the tap incremental gain circuits $97A_n$ and $97B_n$ in FIG. 10 that produce $\Delta c_{-n}$ or $\Delta d_{-n}$. The reference signal for computing the error signal $AE'_k$ for example is obtained by rotating the equalized sampled signal vector ($A'_{k-1}$, $B'_{k-1}$) that was obtained in the k-$1^{th}$ symbol interval by this phase angle $\Delta\theta$. Thus, the error signal $AE'_k$ is a comparison of the equalized in-phase component $A'_k$ of the $k^{th}$ signal sample with a reference which is the in-phase component of the k-$1^{th}$ equalized signal sample vector ($A'_{k-1}$, $B'_{k-1}$) after the latter is rotated by the phase angle $\Delta\theta$. The error signals $AE'_k$ and $BE'_k$ of this invention, therefore, are not related to a fixed phase reference. The advantage is that a phase error caused by an instantaneous change in phase (e.g., a change in phase due to transmission path switching) will produce only a data error in a single pair of adjacent symbols, whereas in a prior-art system employing a fixed reference such phase and data errors will be compounded or repeated in subsequent symbol intervals until this error is finally detected and corrected. Also, phase jitter has minor effect on structure embodying this invention since here the impairment is the differential phase jitter occurring over one symbol interval, whereas in the described prior-art system the impairment is the peak instantaneous jitter occurring over many symbol intervals.

Figure 12:
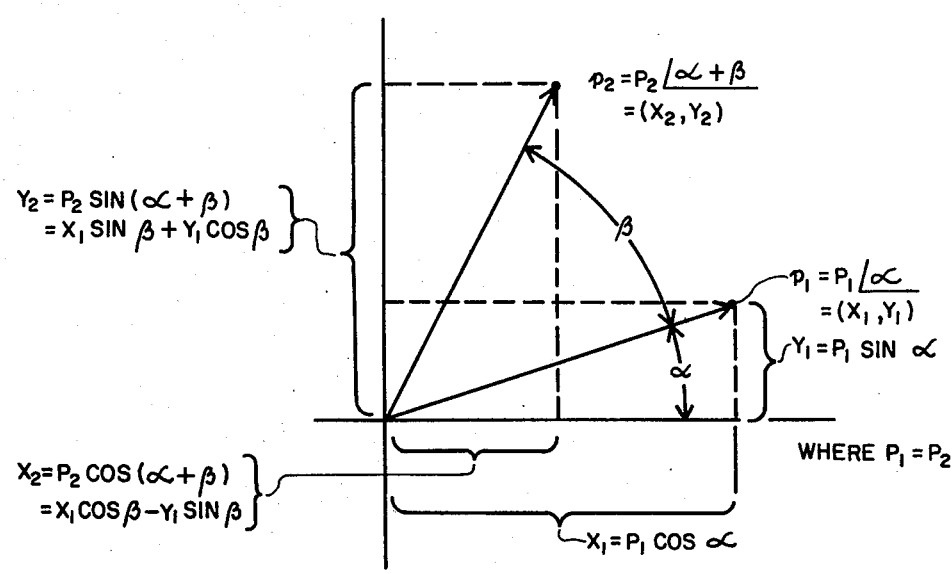
FIG. 12 is a graphic representation of rotation of a vector $p_1$ by an angle $\beta$.

The rotation of a vector $p_1$ by an angle $\beta$ to yield second vector $p_2$ is graphically illustrated in FIG. 12. The horizontal and vertical components of the vector $p_1 = P_1 \angle \alpha = (X_1, Y_1)$ are $X_1 = P_1 \cos \alpha$ and $Y_1 = P_1 \sin \alpha$, respectively. The second vector $P_2$ is obtained by rotating the vector $P_1$ by the angle $\beta$. The corresponding components of the vector $p_2$ are therefore $X_2 = P_2 \cos(\alpha + \beta)$ and $Y_2 = P_2 \sin(\alpha + \beta)$, respectively, as is shown in FIG. 12 where $P_1 = P_2$. The terms $X_2$ and $Y_2$ can be expanded by well-known trigonometric identities and substitution of the terms $X_1$ and $Y_1$ to be $$X_2 = X_1 \cos \beta - Y_1 \sin \beta, \quad (7)$$

and $$Y_2 = X_1 \sin \beta + Y_1 \cos \beta, \quad (8)$$

which define the in-phase (horizontal) and quadrature (vertical) components $X_2$ and $Y_2$ of the rotated vector $P_2$. These latter expressions for $X_2$ and $Y_2$ have the same form as the bracketed terms in equations (3) and (4), respectively.

Figure 13:
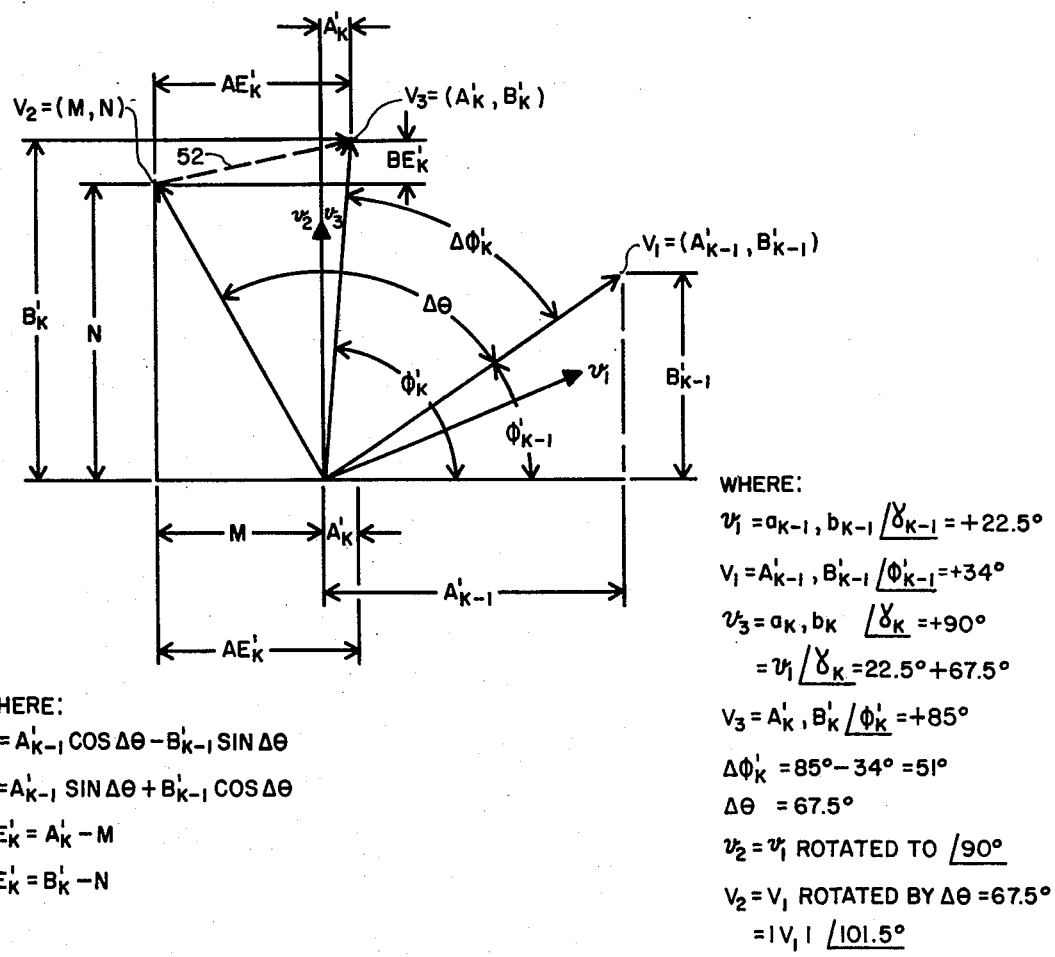
FIG. 13 is a graphic representation of the expressions for $AE'_k$ and $BE'_k$ in equations (3) and (4)

FIG. 13 is a graphic representation of what is expressed by equations (3) and (4). The vector $v_1$ represents a data signal sample vector $(a_{k-1}, b_{k-1}; |\gamma_{k-1} = +22.5°)$ that is transmitted during the $k-1^{th}$ sample. The associated vector $V_1$ represents an equalized data signal sample vector $(A'_{k-1}, B'_{k-1}; |\phi'_{k-1} = +34°)$ that is received during the $k-1^{th}$ sample with a phase angle of +34° which is different from the +22.5° of the corresponding transmitted vector $V_1$ (i.e., the received vector $V_1$ has a phase error of $11.5° = 34° - 22.5°$). The vector $v_3$ represents a data signal sample vector $(a_k, b_k; |\gamma_k = +90°)$ which is transmitted during the $k^{th}$ sample. The associated vector $V_3$ represents the equalized data signal sample vector $(A'_k, B'_k; |\phi'_k = +85°)$ which is received during the $k^{th}$ sample with a phase error of $5° = 90° - 85°$. The actual difference between the phases of the $k^{th}$ and $k-1^{th}$ equalized samples $(A'_k, B'_k)$ and $(A'_{k-1}, B'_{k-1})$ of the received signals is $\Delta\phi'_k = 51° = 85° - 34°$. The phase angle $\Delta\theta$ is the quantized value of the phase difference $\Delta\phi'_k$ that is the closest odd multiple of 22.5° to $\Delta\phi'_k = 51°$. Thus, $\Delta\theta = 67.5°$ in this example. The manner in which a phase difference $\Delta\phi'_k$ is quantized into an angle $\Delta\theta$ is summarized in Table I, columns 1 - 3. The vectors $v_2$ and $V_2$ represent the vectors $v_1$ and $V_1$, respectively, rotated by the phase angle $\Delta\theta$.

It is shown in FIG. 13. that the in-phase (horizontal or X) and quadrature-phase (vertical or Y) components M and N, respectively, of vector $V_2$ are the bracketed terms in equation (3) and (4), respectively. The vector line 52 in FIG. 13 represents the difference between the vectors $V_3$ and $V_2$, and is therefore the error vector $(AF'_k, BE'_k)$.

The equalizer 40 in FIG. 11 generally comprises a digital delay line circuit 54, correlation 55, tap gain multiplier circuit 56, and tap summer circuit 57 which are responsive to an unequalized $k^{th}$ sample $(A_k, B_k)$ of a data signal on line 53 for producing a current $(k^{th})$ equalized signal sample $(A'_k, B'_k)$ on line 58; and an error summer circuit 59 which is responsive to the $k^{th}$ equalized signal sample $(A'_k, B'_k)$ from the tap summer circuit 57 and the operation of a switched modulator circuit 60 for producing the error signal $(AF'_k, BF'_k)$ on line 61. The delay circuit 54 here has $2n+1$ taps, with a vector signal $(A_{k+n}, B_{k+n})$ at each tap, and is responsive to the $k^{th}$ unequalized signal sample $(A_k, B_k)$ of a data signal on line 53 for producing delayed signal samples $(A_{k+n}, B_{k+n}$, where $n \neq 0)$ that are applied on line 63 to correlation circuit 55 and on line 64 to tap gain multiplier circuit 56. Delay circuit 54 also produces delayed signal samples $(A_{k+n}, B_{k+n}$, where $n = 0)$ on line 65. Correlation circuit 55 is also responsive to the error signal $(AF'_k, BF'_k)$ on line 61 for producing updated tap gains $(c_{-n}, d_{-n}$, where $n \neq 0)$ on line 66. The updated tap gains $c_{-n}$, for example, initially on line 66 in the symbol interval $k$ are equal to the tap gains $c_{-n}$ at the end of the $k-2^{th}$ symbol interval (i.e., the beginning of the $k-1^{th}$ symbol interval) plus new incremental tap gains $\Delta c_{-n}$ derived by circuit 55 during the $k-1^{th}$ symbol interval. The tap gain multiplier circuit 56 is operative for producing output signals on line 67 which are weighted values of the signal samples $(A_{k+n}, B_{k+n}$, where $n \neq 0)$ and more particularly are the products and cross-products of the signal samples and tap gains on lines 64 and 66. Circuit 57 sums the signals on lines 65 and 67 for producing an equalized signal sample $(A'_k, B'_k)$ on line 58.

Detection circuit 70 is responsive to the components of the equalized signal $(A'_k, B'_k)$ on line 58 for producing a digital signal on line 71 that is a measure of the phase angle $\Delta\theta$ which is the quantized value of the difference $\Delta\phi'_k$ between the phase angle $\phi'_k$ of the $k^{th}$ equalized signal sample $(A'_k, B'_k)$ and the phase angle $\phi'_{k-1}$ of the prior $(k-1^{th})$ equalized signal sample $(A'_{k-1}, B'_{k-1})$. Thus, the digital signal on line 71 is a measure of one of eight different values of phase angles as is illustrated in columns 3 and 4 of Table I. This operation of the detection ciricuit 70 in FIG. 11 will now be described in more detail in relation to FIGS. 2 and 3, the vector diagram in FIG. 13, and Table I. The 3-bit words in FIG. 2 uniquely define difference angles $\Delta\phi$ as odd multiples of 22.5°. Stated differently, the 3-bit words in the scheme of FIG. 2 can only define a phasse angle with an accuracy of ±22.5°. The phase angle 0° is defined by the 3-bit word 000. Analysis of FIG. 2, however, reveals that digital words representing phase angles of greater than or equal to 0° but less than +45° will all have 3 consecutive MSB's that are all zeros although additional LSB's may be any combination of 1's and 0's. Thus, any phase angle of greater than or equal to 0° but less than +45° is defined or quantized to the 3-bit word 000 as being the angle +22.5°. In accordance with a preferred embodiment of this invention, circuit 70 quantizes digital representations of phase differences $\Delta\phi'_k$ to be odd multiples of 22.5° by truncating digital representations thereof to their 3 MBS's. This operation is summarized in columns 1 - 4 of Table I.

In the example that is graphically illustrated in FIG. 13 for particular transmitted signals, the actual transmitted phase angle $\gamma_{k-1} = +22.5°$ for the $k-1^{th}$ data signal vector $v_1$ and the actual transmitted phase angle $\gamma_k = +90°$ for the $k^{th}$ data signal vector $v_3$. The transmitted phase difference $\Delta\gamma_k = +67.5° = +90° - 22.5°$. The transmission channel 5 normally introduces distortion into the received data signal. Values of the phase angles in the equalized signals in FIG. 13 for particular values of distortion selected for this example are $\phi'_{k-1} = +34°$ and $\phi'_k = +85°$. Thus, the phase difference $\Delta\phi'_k = 51°$ is different from the transmitted phase difference $\Delta\gamma_k = 67.5°$. This phase difference $\Delta\phi'_k = 51°$ is in the second quadrant (between +45° and +90°), and the multibit word that is representative thereof is therefore quantized to the phase angle $\Delta\theta = 67.5°$ which corresponds to the 3-bit word 001, see Table I, row 3, columns 3 and 4.

The equalized signal ($A'_k$, $B'_k$) is delayed one symbol interval by the unit delay element 72 and applied to circuit 60 in FIG. 11. The switched modulator circuit 60 is responsive to the signals on line 71 and 73 for producing signals which correspond to the negative of the bracketed terms on the right side of equations (3) and (4). The signals on lines 58 and 74 are combined by summer circuit 59 to produce the error signal ($AE'_k$, $BE'_k$) on line 61.

The equalizer 40 is shown in more detail in FIG. 9 where: the delay line circuit 54 comprises a pair of conventional delay lines each including $2n$ tandemly connected unit delay elements $76_n$ and $77_n$ receiving in-phase and quadrature-phase sampled signal components $A_k$ and $B_k$ on lines 10 and 12, respectively; the correlation circuit 55 and tap gain multiplier circuit 56 comprise the $2n = 6$ tap gain control circuits $50n$; the tap summer circuit 57 comprises the adder circuits 79 and 80; the detection circuit 70 comprises phase detector 81, unit delay element 82, adder circuit 83, and quantizer 84; the switched modulator circuit 60 comprises the switched modulator 86 and 87 and multipliers 88 to 91; and the error summer circuit 59 comprises adders 93 and 94. The elements in FIG. 9 are similar to those in U.S. Pat. No. 3,787,762, Jan. 22, 1974, Self-Adaptive Equalizer for Quadrature Amplitude Modulated Signals by Y. Sato. Timing signals for elements in FIGS. 9 – 11 are not shown here since such operation is well known in the art.

As was stated previously, a received data signal is sampled in the receiver of FIG. 4 once during each symbol interval T and is held constant for a subsequent time interval T that is equal to the symbol interval. The digital representations of sampled signal components on input lines 10 and 12 in FIG. 9 therefore correspond to the $k^{th}$ samples of the in-phase and quadrature-phase components of a received signal which are designated $A_{k+3}$ and $B_{k+3}$ for convenience since they are applied to the first tap gain control circuit $50_{+3}$ where $n = 3$ in this equalizer. Thus, the in-phase and quadrature-phase delay lines comprise $2n = 6$ in-phase and $2n = 6$ quadrature-phase delay elements $76_n$ and $72_n$, respectively. Each of the delay elements has a unit delay of T seconds which is equal to the duration of the symbol interval. By way of example, the delay lines may shift registers where each delay element comprises a number of flip-flops. Associated delay lines have $2n + 1 = 7$ in-phase and $2n = 1 = 7$ quadrature-phase tap lines $95A_n$ and $95B_n$, respectively. Similarly numbered pairs of tap lines, other than the principal, main or center tap lines $95A_o$ & $95B_o$, are connected to associated tap gain control circuits $50_n$. Since all of the tap gain control circuits are identical, only tap control circuit $50_{+3}$ will be described in detail.

The tap circuit $50_{+3}$ is shown in detail in FIG. 10. The plus sign symbol is not included in the subscript designation of each element in FIG. 10 and this description for simplicity of illustration. Circuit $50_{+3}$ comprises in-phase and quadrature-phase incremental tap gain circuits $97A_{+3}$ and $97B_{+3}$; in-phase and quadrature-phase combining circuits $98A_{+3}$ and $98B_{+3}$; a pair of in-phase tap gain multipliers $101A_3$ and $102A_3$; and a pair of quadrature-phase tap gain multipliers $101B_3$ and $102B_3$. The correlation circuit 55 in FIG. 11 comprises all of the circuits $97A_n$ and $97B_n$ and the combining circuits $98A_n$ and $98B_n$ in the tap gain control circuits $50_n$. Similarly, tap gain multiplier circuit 56 in FIG. 11 comprises the plurality of pairs of in-phase and quadrature-phase tap gain multipliers $101A_n$, $B_n$ and $102A_n$, $B_n$ in the tap control circuits $50_n$.

Each of the tap gain multipliers $101B_3$ and $102B_3$ is timed at the start of a symbol interval for multiplying as associated one of the $kth$ sample signal components $B_{k+3}$ and $A_{k+3}$ on tap lines $95B_{+3}$ and $95A_{+3}$ by an associated one of the updated tap gains $d_{-3}$ and $c_{-3}$ that was computed during the prior $K\text{-}1^{th}$ symbol interval. The multipliers $101A_3$ and $102A_3$ are identical, except that the multiplier $102A_3$ includes additional circuitry for reversing the sign bit of the sampled signal component word $B_{k+3}$ on line 103. The tap gain multipliers 101 and 102 may comprise weighting attenuators which are responsive to values of tap gains $c_{-3}$ or $d_{-3}$ for adjusting the levels of associated sampled signal components words $A_{k+3}$ or $B_{k+3}$.

Briefly, circuits $101A_3$ and $101B_3$ relates the old tap gain $c_{-3}$ from the $k\text{-}1$ symbol interval to the current $k^{th}$ unequalized in-phase and quadrature-phase sampled signal component words $A_{k+3}$ and $B_{k+3}$ at lines $95A_{+3}$ and $95B_{+3}$, respectively. Similarly, circuits $102A_3$ and $102B_3$ relate the old tap gain $d_{-3}$ from the $k\text{-}1^{th}$ symbol interval to the negative of the $k^{th}$ unequalized quadrature-phase sampled signal component word $B_{k+3}$ and to the $k^{th}$ unequalized in-phase sampled signal component word $A_{k+3}$, respectively. The outputs of each pair of in-phase tap gain multipliers $101A_n$ and $102A_n$ are applied to adder circuit 79. Similarly, the outputs of each pair of quadrature-phase tap gain multipliers $101B_n$ and $102B_n$ are applied to the second adder circuit 80. The sampled signal components $A_{k+o}$ and $B_{k+o}$ at the center tap lines $95A_o$ and $95B_o$ are applied directly to associated adders 79 and 80. The output words from adder circuits 79 and 80 correspond to the $k^{th}$ equalized in-phase and quadrature-phase sampled signal components $A'_k$ and $B'_k$, respectively, of a received data signal.

Referring now to FIG. 9, phase detector 81 is responsive to the $k^{th}$ equalized sampled component words $A'_k$ and $B'_k$ on lines 46 and 48 for producing an output on line 107 that is a measure of the phase angle $\phi'_k$ of a current sample of the received signal. This is readily accomplished since the phase angle $\phi'_k = \tan^{-1} B'_k/A'_k$. Detector 81 may be similar to that described in U.S. Pat. No. 3,825,737, July 23, 1974, Digital Phase Detector by A. Croisier. The elememt 82 is a unit delay element which stores the word representing the phase angle $\phi'_k$ of a signal sample for one symbol interval. Thus, the word on line 108 during the $k^{th}$ symbol interval corresponds to the phase angle $\phi'_{k-1}$ which was detected during the prior $k\text{-}^{th}$ symbol. Adder 83 includes circuitry for summing the words representing the phase angle $\phi'_k$ and the negative of the phase angle $\phi'_{k-1}$.

Quantizer 84 operates as was described in relation to circuit 70 in FIG. 11 to convert the phase difference $\Delta\phi'_k$ on line 109 to a phase angle $\Delta\theta$, which is the closest odd multiple of 22.5° thereto and thus to a phase angle $\Delta\theta$ that is the most likely value of the transmitted phase difference and data. Quantizer 84 comprises conventional digital logic circuitry to perform the functions summarized in Table I, column 1 – 4, to truncate the word on line 109 to its 3 MSBs. The output of the quantizer 84 at any instant of time is therefore a word defining one of the eight different phase angles $\Delta\theta$ in column 3 indicating what phase difference was actually encoded and transmitted to the receiver.

The switched modulators 86 and 87 are digital logic circuits that are responsive to the quantized signal $\Delta\theta$ on line 110 for producing words on lines 112 and 113 that correspond to the sin $\Delta\theta$ and cos $\Delta\theta$, respectively. Reference to columns 5 and 6 of Table I reveals that there are only 4 possible values of either the sine or cosine of these phase angles $\Delta\theta$, i.e., either $\pm 0.383$ or $\pm 0.925$. When the word on line 110 is a measure of $+22.5°$, for example, the output words of circuits 86 and 87 are measures of $+0.925$ and $+0.383$, respectively, see Table I, row 4, columns 3, 5, and 6. The output signal of the cosine modulator is applied to the inverting inputs of multipliers 88 and 91. Similarly, the output signal of the sine modulator 87 is applied to the inverting and noninverting inputs of multipliers 89 and 90, respectively.

The equalized sampled component words $A'_k$ and $B'_k$ on lines 46 and 48 are delayed by associated unit delay elements 115 and 116 to produce the words $A'_{k-1}$ and $B'_{k-1}$ that are applied to other noninverting inputs of multipliers 88 and 89 and multipliers 90 and 91, respectively. Thus, the outputs of multipliers 88–91 are product signals which occur in the bracketed terms in the right-hand side of equations (3) and (4). The output signals of multipliers 88 and 90 which are applied on lines 117 and 118 to adder 93 are the signals $-A'_{k-1}\cos\Delta\theta$ and $+B'_{k-1}\sin\Delta\theta$, respectively. The outputs of multipliers 89 and 91 which are applied on lines 119 and 120 to adder 94 are the signals $-A'_{k-1}\sin\Delta\theta$ and $-B'_{k-1}\cos\Delta\theta$, respectively. The equalized in-phase and quadrature-phase sampled signal component words $A'_k$ and $B'_k$ are also applied to inputs of associated adders 93 and 94. The output signals of adders 93 and 94 are the desired new values of in-phase and quadrature-phase common error signal component words $AE'_k$ and $BE'_k$ that are applied on lines 123 and 124, respectively, to each tap gain control circuit $50_n$. Thus, it is seen that the sine and cosine modulators 86 and 87, multipliers 88–91, and adders 93 and 94 cooperate to produce the necessary phase rotation of the equalized sampled signal vector $(A'_{k-1}, B'_{k-1})$ (which is derived during the prior $k$-$1^{th}$ signal sample) by the quantized differential phase angle $\Delta\theta$ as is required by equations (3) and (4) for producing the desired error signals. It is now only necessary to compute updated values of the tap gains $c_{-n}$ and $d_{-n}$ during the $k^{th}$ symbol interval for use in effecting equalization during the next symbol interval.

Again, referring to FIG. 10, the in-phase tap gain circuit $97A_{+3}$ comprises a pair of tap error multipliers $125A_3$ and $126A_3$, an adder circuit $127A_3$, a multiplier $128A_3$ which has a constant gain that is proportional to the term $-2K$ in equations (1) and (2). Multiplier $125A_3$ is responsive to the $k^{th}$ unequalized sample $A_{k+3}$ on tap line $95A_{+3}$ and the common in-phase error signal $AE'_k$ on line 123 for producing a product signal on line $129A_3$. Similarly, multiplier $126A_3$ is responsive to the $K^{th}$ unequalized quadrature-phase sample $B_{k+3}$ on the quadrature phase tap line $95B_{+3}$ and the common quadrature-phase error signal $BE'_k$ on line 124 for producing a product signal on line $130A_3$. The common error signals $AE'_k$ and $BE'_k$ are each applied to associated tap error multipliers of each tap control circuit $50_n$. Adder $127A_3$ sums the digital represenation of the product signals on lines $129A_3$ and $130A_3$ to produce a digital signal which is adjusted by multiplier $128A_3$ to produce on line $131A_3$ the new updated value of incremental tap gain $\Delta c_{-3}$.

Combining circuit $97A_{+3}$ comprises the parallel combination of an adder circuit $133A_3$ and sample-hold circuit $134A_3$ which may comprise a number of flip-flops. The output signal of the adder $133A_3$ is the tap gain $c_{-3}$ which is sampled during each symbol interval and stored by circuit $134A_3$. Thus, the signal on line $135A_3$ during computation of an updated value of $c_{-3}$ in the $k^{th}$ symbol interval is the old value of $c_{-3}$ that is produced during the $k$-$1^{th}$ symbol interval. Adder $133A_3$ sums the old ($k$-$1^{th}$) value of $c_{-3}$ on line $135A_3$ and the new ($k^{th}$) value of $\Delta c_{-3}$ on line $131A_3$ to produce on line $136A_3$ a digital word that is the updated ($k^{th}$) value of $c_{-3}$. This representation of $c_{-3}$ does not vary as a function of time over the symbol interval.

The quadrature phase incremental tap gain circuit $97B_{+3}$ of tap control circuit $50_{+3}$ is similar to the in-phase incremental tap gain circuit $97A_{+3}$ except that the quadrature-phase multiplier $125B_3$ includes conventional circuitry for reversing the sign bit of the unequalized quadrature phase signal sample word $B_{k+3}$ on tap line $95B_{+3}$. Multiplier $125B_3$ multipliers the signals $-B_{k+3}$ and $AE'_k$ whereas multiplier $126B_3$ multipliers the signals $A_{k+3}$ and $BE'_k$. The output signal of multiplier $128B_3$ and circuit $97B_{+3}$ on line $131B_3$ is the new incremental quadrature-phase tap gain $\Delta d_{-3}$. Adder $133B_3$ and sample-hold circuit $134B_3$ combine the stored $k$-$1^{th}$ value of $d_{-3}$ with the new ($k^{th}$) word $\Delta d_{-3}$ to produce the updated value of $d_{-3}$ on line $136B_3$.

These updated values of $c_{-3}$ and $d_{-3}$ computed at the end of the $k^{th}$ symbol interval are employed in the next ($k+1^{th}$) symbol interval to produce an equalized signal.

The equalizers are described in relation to FIGS. 9 – 11 as receiving digital signals that are produced on lines 10 and 12 of the receiver in FIG. 4 and as employing digital circuitry for effecting the requisite equalization of receive data signals. Equalization of such signals may also be effected with analog circuitry. The baseband receiver section of a data modem 7 for such an analog sampled baseband equalizer is shown in FIG. 5. The analogue processor 23' was functionally the same as that illustrated in FIGS. 9–10 where basic elements of the processor were implemented with analog circuitry. In this analog equalizer, the analog signals $A_k$ and $B_k$ from sample-hold circuits 28 and 21 on lines 29 and 22 were applied directly to the delay lines in FIG. 9 wherein each unit delay element $76n$ and $77n$ comprised a pair of sample-hold circuits that were connected in series and responsive to a pair of clock signals to function as a full symbol delay element. Although the detection circuit 81 in FIG. 9 may be implemented in analog circuitry using conventional techniques, this function may be implemented more economically and with less circuitry by digital techniques. In the analog equalizer that was built and tested, A/D converters were employed in lines 46 and 48 to produce equalized sampled signal component words $A'_k$ and $B'_k$ which were operated on with digital elements in all of circuit 70, as was previously described. The functions of the sine and cosine-switched modulators 87 and 86 were also accomplished with digital logic circuits in view of the simplicity of performing these functions. D/A converters were employed in lines 112 and 113 for converting back to analog signals prior to application thereof to associated analog multipliers 88–91. Also, the function of adders $133_n$ and sample-hold circuits $134_n$ in each tap gain control circuit $50_n$ may be implemented with an analog integrator circuit. Although the values of $c_{-n}$ and $d_{-n}$ then vary with time over a symbol interval, this would not normally adversely affect the operation of the equalizer.

In both the analog baseband equalizers in FIGS. 4 and 5, the signal components $A(t)$ and $B(t$ are sampled prior to processing in circuit 23. Alternatively, the sample-hold circuits 21 and 28 in FIGS. 4 and 5 may be omitted and this function effected on the equalized signal components $A'_k$ and $B'_k$ in lines 46 and 48 in FIG. 8 prior to application to the phase detector 41. This equalizer then still operates on a sample basis. In another alternate embodiment, the sample-hold circuits 21 and 28 in FIG. 5 and their functions may be omitted so that this analog baseband equalizer operates in real time. In this latter structure, the analog signals $A_{k+n}$ and $B_{k+n}$ (at associated delay line tap line); $A'_k$ and $B'_k$ (at lines 46 and 48); $A'_{k-1}$ and $B'_{k-1}$ (at the outputs of elements 115 and 116); $\theta'_k$, $\theta_{k-1}$, and $\Delta\phi'_k$ (at lines 107, 108 and 109); and $AE'_k$ and $BE'_k$ (at lines 123 and 124) are represented as $A(t+n)$; and $B(t+n)$; $A(t)'$ and $B(t)'$; $A(t-1)'$ and $B(t-1)'$; $\phi(t)'$; $\phi(t-1)'$ and $\Delta\phi(t)'$; and $AE(t)'0$ and $BE(t)'$, respectively. The structure of the associated processor and equalizer is similar to that in FIGS. 9 and 10, although timing signals and sampling are no longer employed.

Digital and analog embodiments of the receiver section of a data modem for operating in the passband are illustrated in FIGS. 6 and 7, respectively. The analog embodiment was built and tested. The receive signal $So(t)$ is split into its in-phase and quadrature-phase components $A(t)$ and $B(t)$ by the phase splitter 141. The sampled signal components $A_k$ and $B_k$ are functions of the cosine and sine, respectively, of both the data phase angle $\phi(t)$ and the carrier frequency term $\omega_c t$. The processors for the corresponding digital and analog passband equalizers are functionally and structurally equivalent to that shown in FIGS. 9 and 10. By way of example, the delay lines here are more broadband circuits. The signals at different points in this circuit, however, have more complex representations than those that are shown in FIGS. 9 and 10. In particular, the phase angles on lines 107 and 108 include both a data phase angle $\phi$ and a carrier frequency term $\omega_c T$, and are representable as $\phi'_k + {}_k\omega_c T$ and $\phi'_{k-1} + (k1)\omega_c T$. Thus, the difference signal on line 109 is $\Delta'_k + \omega_c T$ and does contain the required carrier frequency term $\omega_c T$. It is therefore not necessary for the quantizer 84 in FIG. 9 for the passband equalizer to add a constant phase angle to the phase difference prior to quantizing this signal.

In an alternate embodiment, the time-varying passband signal components $A(t)$ and $B(t)$ on lines 27' and 20' in FIG. 7 may be applied directly to the processor and the analog passband equalizer operated in real time.

In the analog passband receiver in FIG. 7, the received signal is divided into its in-phase and quadrature-phase components A and B prior to application to a pair of delay lines in the processor. Alternatively, the in-phase passband signal $A(t)$ may be applied to a single delay line in the processor. In-phase and quadrature-phase components of the received signal may then be produced by connecting the passband signal at each tap of the delay line directly to an associated in-phase line and through a 90° phase shifter to an associated quadrature-phase line of the associated tap gain control circuit. Alternatively, the same in-phase passband signal from each tap of the delay line may be connected to both the in-phase and quadrature-phase lines of associated tap gain control circuits in FIGS. 9 and 10, the tap gains $c_{-n}$ and $d_{-n}$ here being applied to separate ones of the signals on these lines. Outputs of the control circuits associated with only $c_{-n}$ and $d_{-n}$ are summed separately with the phase of the latter sum signal being shifted 90°. The resulting signals are added to produce an equalized signal that can be demodulated to produce in-phase and quadrature-phase signals for use in obtaining the requisite phase angle indications.

In accordance with a preferred embodiment of this invention, processor 23 is a central processing unit (CPU) or other high-speed digital computer or special-purpose digital computer on which the steps of equalization and phase detection are preformed in real time. In an 8-phase, differentially phase-modulated data transmission system operating at a carrier frequency of 1800 Hz and a symbol rate of 1600 Hz with a tribit signal encoding such that the data rate is 4800 bits per second, it has been found desirable that the basic cycle time of the computer be in the order of or less than 800 nanoseconds. Commercially available digital computers for performing these functions include the Nova 800 and Supernova with semiconductor memory by Data General Corporation of Southborough, Mass. Since digital multiplication and division of digital words entails a large number of operations and requires considerable time to perform, some commercially available computers and some special-purpose computers perform these operations in hard-wired digital circuits that are external to the computer as is known in the art. A special-purpose digital computer is normally more economical than a commercially available digital computer since its operation can be tailored to particular functions that it is required to perform.

A special-purpose digital computer which functions in accordance with this invention and the machine-type language flow diagrams of FIGS. 15 to 19 to perfect equalization of received data signals and phase detection was successfully built and operated. In order for this computer to operate at high speeds with cycle times in the order of 800 nanoseconds, the length of digital words used in instructions and operations was restricted to 8- and 12-bit words; a small memory was incorporated; and instructions were stored in auxiliary memory and read out in sequence such that the computer did not have to derive a subsequent instruction, but merely obtained it from auxiliary memory. This computer included a pair of read-only memory (ROM's) containing stored programs; random-access memories (RAM) containing variables that are operated on by the program; a data look-up ROM containing stored values of arc tangent of 0° to 45° in steps, and stored values of the sine and cosine of the phase angles in Table I, columns 5 and 6; X, Y, and accumulator (ACC) registers for use in performing various mathematical operations; an index counter; and a program counter. This computer is capable of carrying out the mathematical instructions of addition, subtraction, multiplication, and division with the assistance of the X, Y, and accumulator registers where:

in addition, the contents of ACC are added to the contents of X, with the sum being formed in ACC;

in subtraction, the contents of X are subtracted from the contents of ACC, with the difference being formed in ACC;

in multiplication, the contents of X are multiplied by the contents of Y, with the product being formed in ACC; and in division, the contents of ACC are divided by the contents of X, with the quotient being formed in Y. The operations of multiplication and division are actually performed in hard-wired circuits with the aid of the specified registers, in a conventional manner. In each of the addition, subtraction, and multiplication operations, the contents of X are retained in that register. Similarly, in the division operation, the contents of ACC and X are retained after this operation is completed.

The contents of the ROM may only be read unidirectionally from memory into the X, Y or ACC registers. Similarly, the contents of the RAM may only be read unidirectionally into the X register. The contents of the RAM may be read into the Y and ACC registers, however, and vice versa. The computer is also restricted to perform only the program instruction steps that are specified in stored program memory. The computer does not have to determine what instruction step should be taken next, as the procedure it is to follow is specified in memory. This computer is capable of performing only particular functions that are specified in the program memory. Some of these functions are: increment index counter; LOAD MEMORY, which means to read or load contents of a specified RAM or ROM memory location into a specified register; STORE MEMORY, which means to store the contents of a specified register in a specified RAM memory location; STORE MEMORY (index) which means to store the contents of a particular register in a specified RAM memory location formed by substituting the contents of the index counter for the 3 LSB's of an existing memory address; specified jump instructions such as "$d$"" flag. contents of index counter = 3 or 6, which cause the program counter to be set to a specified count if the test is true; and SET and CLEAR flags, such as the index counter and the "$d$" flag.

Figure 14:
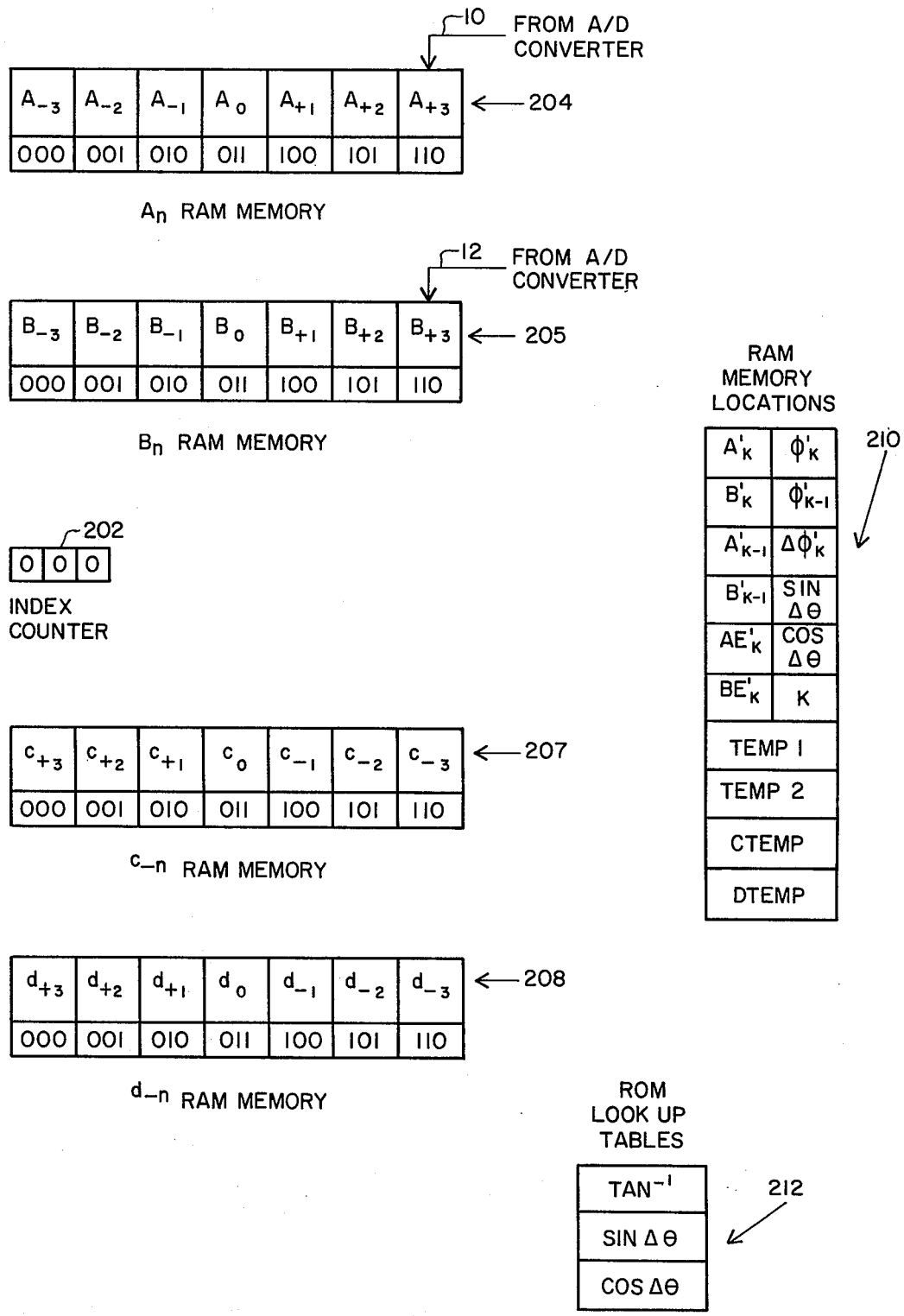
FIG. 14 is a schematic representation of the index counter and various locations in RAM and ROM memories of a digital computer.

The index counter 202 and various locations in RAM and ROM memories are represented by the various blocks in FIG. 14. The sampled signal component words $A_{k+n}$ and $B_{k+n}$ are stored in blocks 204 and 205 where the subscript $k$ is omitted for convenience. Thus, the sampled signal component words $A_{k+3}, A_{k+2}, \ldots, A_{k-3}$, where $n = +3, +2, \ldots -3$ are stored in corresponding memory locations $A_{+3}, A_{+2}, \ldots A_{-3}$, respectively. The memory locations $A_n$ and $B_n$ are arranged for convenience of explanation in decreasing order from right to left in FIG. 14 such that the first and last tap signals $A_{+3}$ and $A_{-3}$, for example, are in the extreme right and left memory positions. The 3 LSB's of the address words for the memory locations $A_n$ and $B_n$ are also shown here and increase progressively from left to right. The $B_n$ memory locations are arranged and designated in a similar manner. The memory locations $c_{-n}$ and $d_{-n}$ for associated tap gain words, however, are shown at blocks 207 and 208 and are arranged in opposite order to the $A_n$ and $B_n$ memory locations such that they progress in increasing order of their subscript numbers from right to left in FIG. 14. The tap gains $c_{-3}$ and $c_{+3}$, for example, are therefore in the extreme right and extreme left memory positions, respectively. Although memory locations $c_o$ and $d_o$ are shown in FIG. 14 for convenience of illustration and explanation, such memory positions are neither needed nor employed as will be apparent from the following description. The 3 LSB's of the address words for memory locations $c_{-n}$ and $d_{-n}$ also increase from left to right in FIG. 14. Stated differently, all of the memory locations $A_n, B_n, c_{-n}$ and $d_{-n}$ are progressively accessed in the order of the address words such that associated words in these memories are combined in the proper order as is described more fully hereinafter. The address words for $A_n, B_n, c_{-n}$ and $d_{-n}$ are referred to hereinafter only by their 3 LSB's for simplicity. Designated memory locations in the RAM, which are specifically referred to herinafter in the programs in FIGS. 15 – 19, are shown in block 210. Look-up tables in the ROM are shown in block 212.

Figure 15A:
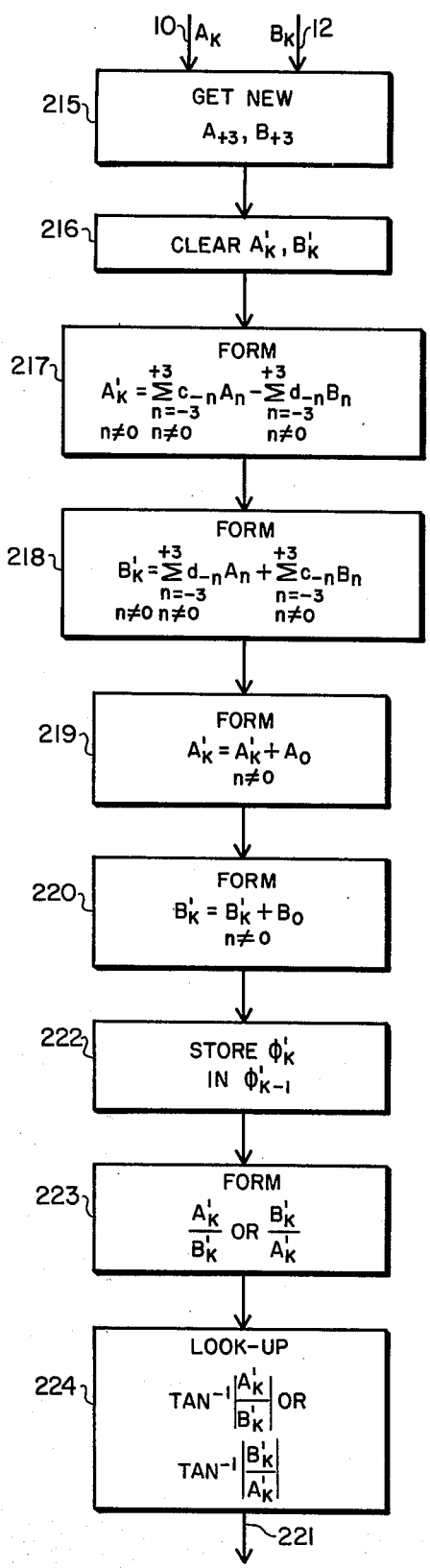
FIGS. 15A and 15B is a flow chart representing one embodiment of the equalizer program of the present invention in its broad sense.
Figure 15B:
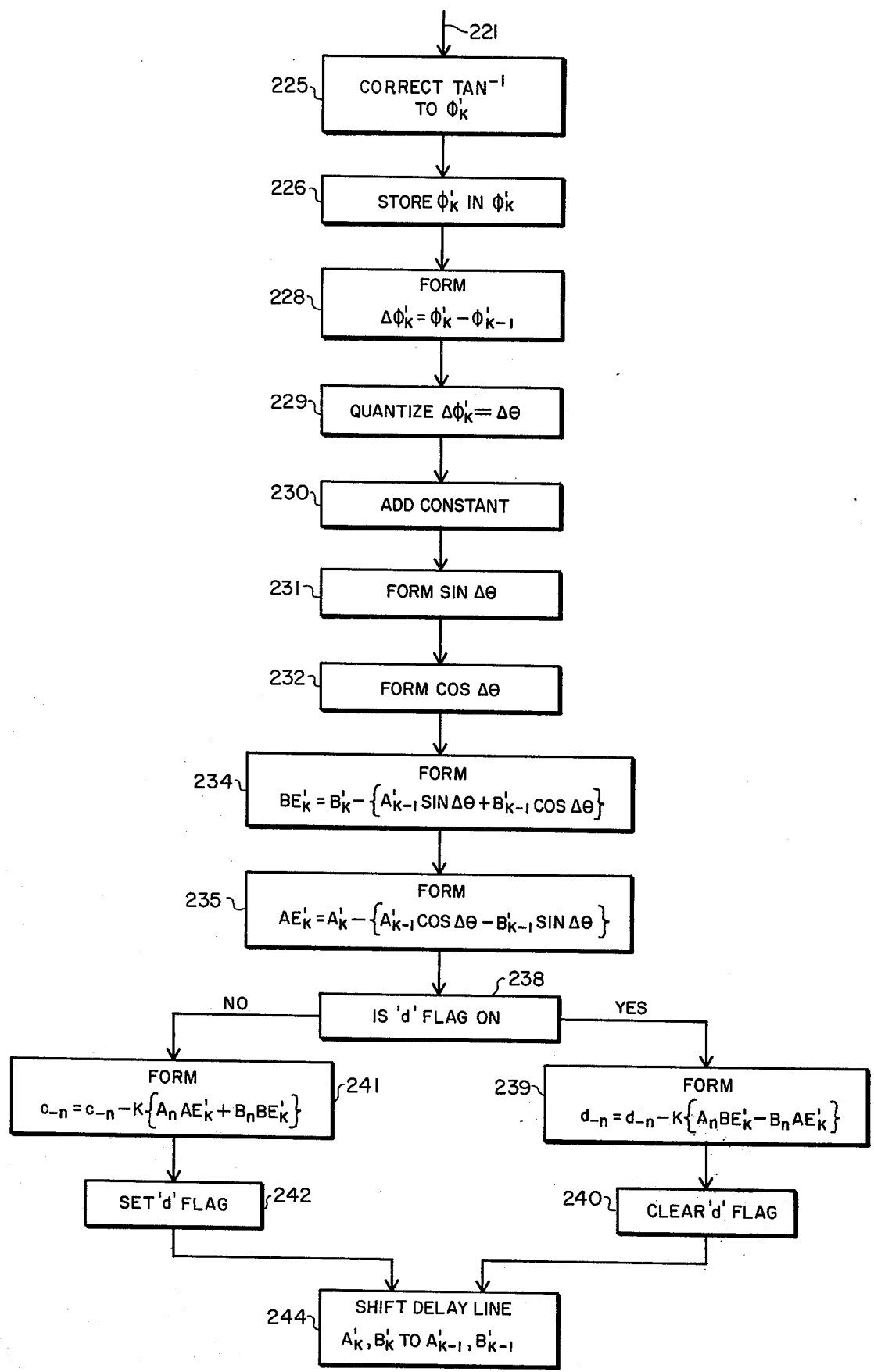

FIG. 15 is a general flow chart showing the basic steps of the disclosed equalization method that are performed by the computer. More detailed flow charts of designated portions of this method are shown in FIGS. 16 – 19. The following description relates to both baseband and passband signal samples, except where specifically designated here.

Referring now to FIG. 15, blocks 215 and 216 indicate that the sampled signal component words $A_k$ and $B_k$ for the current ($k^{th}$) sample of a data signal and appearing on lines 10 and 12 are read into the memory location $A_3$ and $B_3$ and that the memory locations $A'_k$ and $B'_k$ are cleared. Blocks 217 and 218 indicate that intermediate values of $A'_k$ and $B'_k$ where $n \neq 0$ are computed prior to determining the final values thereof as is specified by blocks 219 and 220. The operation blocks 222 – 226 specify that the value of the phase angle $\phi'_k$ computed during the prior symbol interval is stored in memory location $\phi'_{k-1}$ prior to employing the current ($k^{th}$) sample equalized component words $A'_k$ and $B'_k$ to determine the current value of this phase angle. Blocks 228 – 232 require that a digital word corresponding to the phase difference $\Delta'_k$ is produced and quantized to the phase angle $\Delta\theta$ prior to adding a constant to the latter for facilitating forming digital words corresponding to the sin $\Delta\theta$ and cos $\Delta\theta$. Blocks 234 and 235 define the steps of computing the common error signals $BE'_k$ and $AE'_k$, respectively. Decision block 238 requires that the computer determine whether a "$d$" flag is on. If the answer is yes, block 239 causes the computer to form updated values of the tap gains $d_{-n}$ during this $k^{th}$ symbol interval and prior to clearing the "$d$" flag in step 240. If the answer is no, blocks 241 and 242 require the program to compute updated values of the tap gains $c_{-n}$ during the current ($k^{th}$) symbol interval prior to setting the "$d$" flag. Blocks 238 – 242 essentially require the computer to only form updated values of tap gains $d_{-n}$ during alternate symbol intervals, updated values of top gains $c_{-n}$ being computed during the other symbol intervals. Block 244 requires that the words in the $A_n$ and $B_n$ delay line memory locations be shifted into an adjacent memory location at the end of each symbol interval and prior to operating on the next sample of the data signal. Stated differently, block 244 requires that the contents of memory location $A_{-2}$ be shifted into memory location $A_{-3}$, that the contents of memory location $A_{-1}$ be shifted into memory location $A_{-2}$, etc.

Figure 16A:
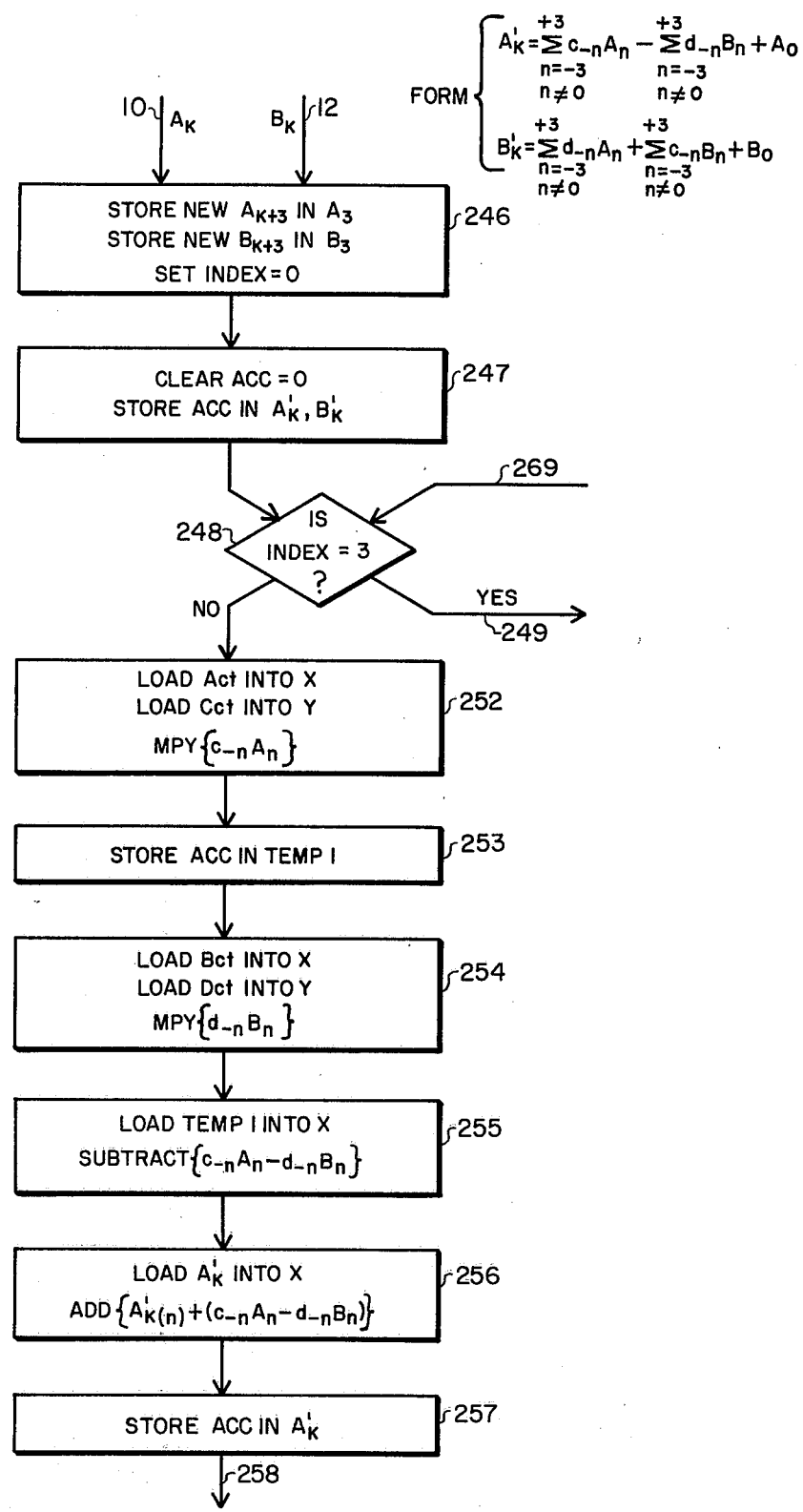
FIGS. 16A, 16B, 17A, 17B, 18, and 19 taken together are detailed flow charts of associated portions of the program in FIGS. 15A and 15B.
Figure 16B:
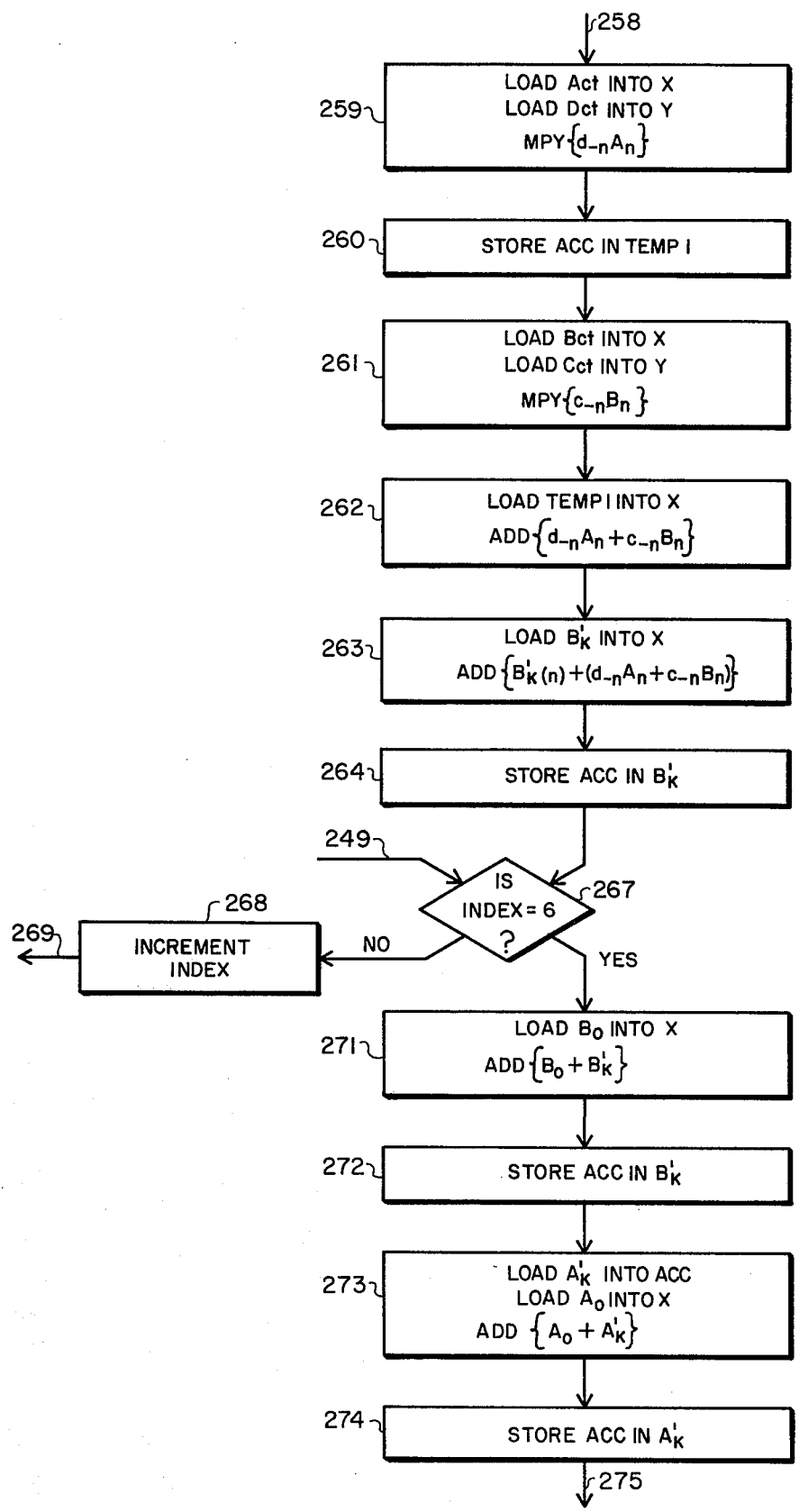

The program steps 215 – 220 for forming current values of equalized signal component words $A'_k$ and $B'_{k_k}$ during the $k^{th}$ symbol interval are outlined in more detail in FIGS. 16A and 16B and employ values of $c_{-n}$ and $d_{-n}$ that were computed during prior symbol intervals. Thus, the equalized component words $A'_k$ and $B'_k$ are based on values of $\Delta\phi'_k, \Delta\theta, AE'_k, BE'_k, c_{-n}$, and $d_{-n}$ that were formed during prior symbol intervals. The program steps 222 – 229 for forming current values of $\phi'_k$ and $\phi\theta$ during the $k^{th}$ symbol interval are outlined in more detail in FIGS. 17A and 17B. The program steps 234 – 235 for forming new values of the error signals $AE'_k$ and $BE'_k$ are shown in detail in FIG. 18. Finally, the program steps 238 – 244 for forming updated values of either $c_{-n}$ or $d_{-n}$ during the current $k^{th}$ symbol interval are shown in greater detail in FIG. 19.

The function of the program in FIGS. 16A and 16B is to receive current ($k^{th}$) sampled signal component words $A_k$ and $B_k$ on lines 10 and 12 and compute associated equalized signal componenet words $A'_k$ and $B'_k$. This computation is performed by an iterative process in a closed loop for all values of $A_n$ and $B_n$, where $n \neq 0$, i.e., except for the principal tap values of $A_o$ and $B_o$ at the center taps here. The values of $A_o$ and $B_o$ are then added to the incremental values of $A'_k$ and $B'_k$, respectively, to produce the desired signals. Since the adjusted or weighted tap signals from the tap control circuits $50_n$ are much less than $A_o$ and $B_o$, this technique prevents overflow by adding in the largest values at the end of the summation process. This program computes intermediate values of $A'_k$ and $B'_k$ for $n \neq 0$ (i.e., using all of the memory locations $A_n$ and $B_n$ in blocks 204 and 205, except the ones addressed by the word 011) and then adding the contents of these memory locations $A_o$ and $B_o$ to associated intermediate values. This causes the program in FIGS. 16A and 16B to employ a pair of decision blocks 248 and 267.

The program block 246 in FIGS. 16A and 16B initializes the computer by entering the current ($k^{th}$) sampled signal component words $A_k$ and $B_k$ on lines 10 and 12 into the memory locations $A_3$ and $B_3$, and setting the index counter 202 to zero. Program block 247 also performs an initializing function by clearing the accumulator and the contents of the memory locations $A'_k$ and $B'_k$. Since the index counter is initially set to zero, decision block 248 directs the computer along the NO path to block 252. The term Act designates the memory location $A_n$ that is defined by the $A_n$ address word whose 3 LSB's correspond to the contents of the index register 202. The terms Cct, Bct, and Dct have similar meanings. Since the content of the index counter 202 is 000 during the first pass through the NO loop, program block 252 causes the contents of memory location $A_{-3}$ at address 000 to be entered in the X register and the contents of memory location $c_{+3}$ at address 000 to be loaded into the Y register. The contents of X and Y are then multiplied together, the product signal being formed in the accumulator (ACC) and stored in the memory location TEMP 1 (block 253). The resultants (e.g., $c_{-n} A_n$ in block 252) are generally indicated in braces in appropriate boxes in FIGS. 16A - 19, inclusive. Similarly, program block 254 causes the contents of memory location $B_{-3}$ at the address 000 to be located into the X register and the contents of the memory location $d_{+3}$ at address 000 to be added loaded into the Y register, the product signal being formed in ACC. The block 255 then causes the product $c_{-n} A_n$ in memory location TEMP 1 to be located into X and the indicated difference signal to be formed in ACC. Program blocks 256 and 257 cause the current content of memory location $A'_k$ to be located into X in order to produce the indicated sum signal in ACC, which is then stored in memory location $A'_k$. The memory location $A'_k$ will contain values other than zero during subsequent passes of this program loop. The subscript "n" in the term $A'_{k(n)}$ in box 256 designates the current value of $A'_k$ that is stored in the memory location $A'_k$. By traversing this loop six different times, the resultant contents of memory location $A'_k$ is the adjusted value of this term where $n \neq 0$. The program blocks 259 - 264 operate in a similar manner to compute a corresponding adjusted value of $B'_k$ where $n \neq 0$, which is stored in the associated memory location $B'_k$.

The decision block 267 is operative for determining whether the contents of the index counter 202 are equal to 6 (i.e., is the word 110). If the answer is no, the index counter is incremented by block 268 and the program returns on path 269 to decision block 248, which causes the no loop to be repeated as long as the contents of the index counter are not equal to 3 (i.e., is not 011). When the contents of the index counter aer 011 or 3, the yes path 249 is taken from decision block 248 to the other decision block 267 which tests whether the content of the index counter is equal to 6. When the answer for test block 267 is in the affirmative, the yes path is taken. The program block 271 causes the contents of the memory location $B_o$ in block 205 to be loaded in the X register and added to the current value of $B'_k$ where $n \neq 0$ (which is still in the accumulator), the sum signal being formed in ACC. The $B_o$ memory location address is in the instruction for block 271. The resultant signal formed by block 271 is the desired $k^{th}$ equalized quadrature-phase component word $B'_k$ which is stored by block 272 in the corresponding memory location. In a similar manner, blocks 273 and 274 load the contents of the memory locations $A'_k$ and $A_o$ into ACC and X, respectively, and add them together to produce the desired $k^{th}$ equalized component word $A'_k$ in ACC which is then stored in the associated memory location.

Figure 20:
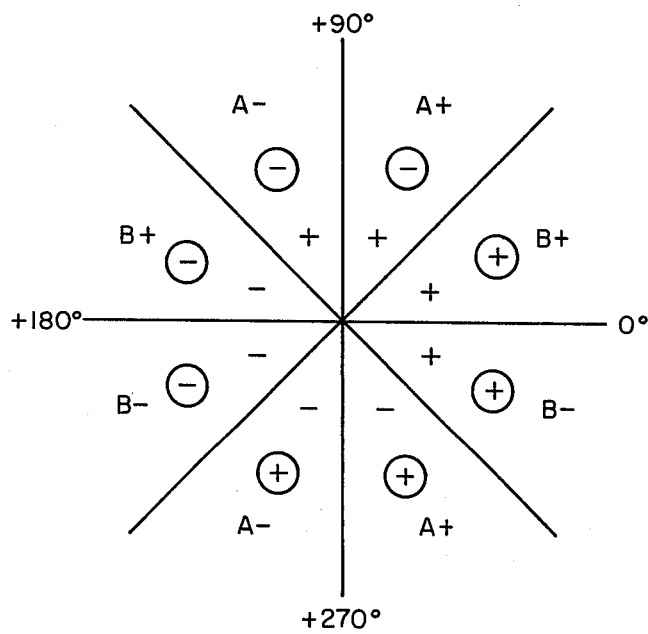
FIG. 20 is a graphic representation of the operation of the program in FIGS. 17A and 17B and of what is stated in Table II, columns 1 – 4.
Figure 21:
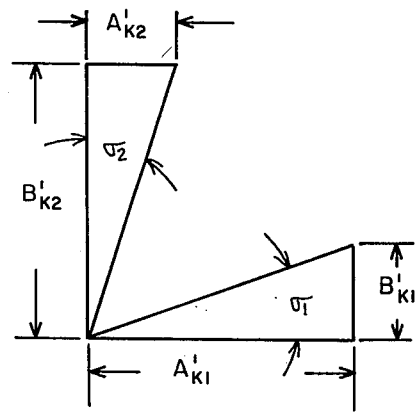
FIG. 21 is a graphic representation of angles defined by in-phase and quadrature-phase signal components.
Figure 17A:
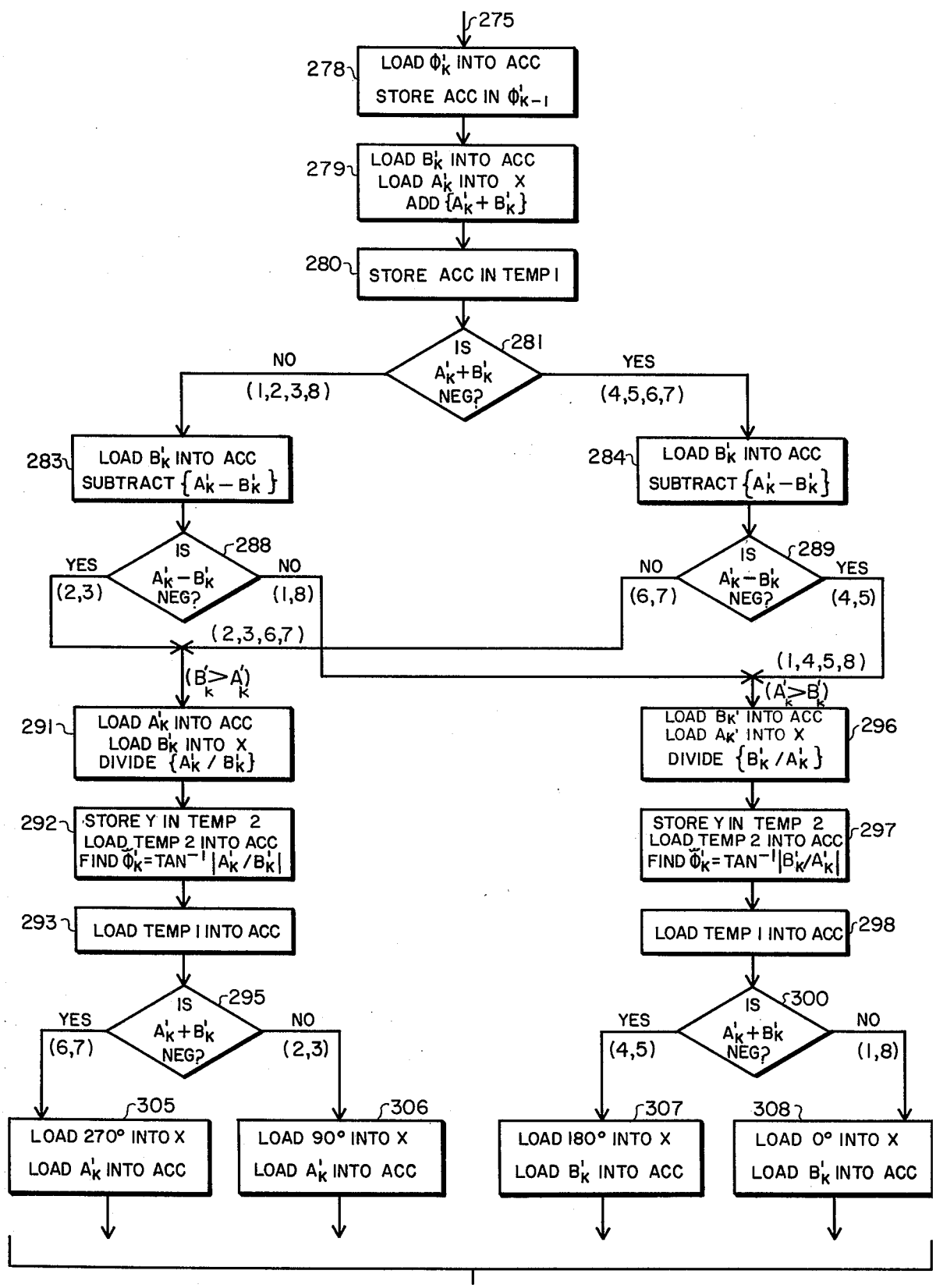
Figure 17B:
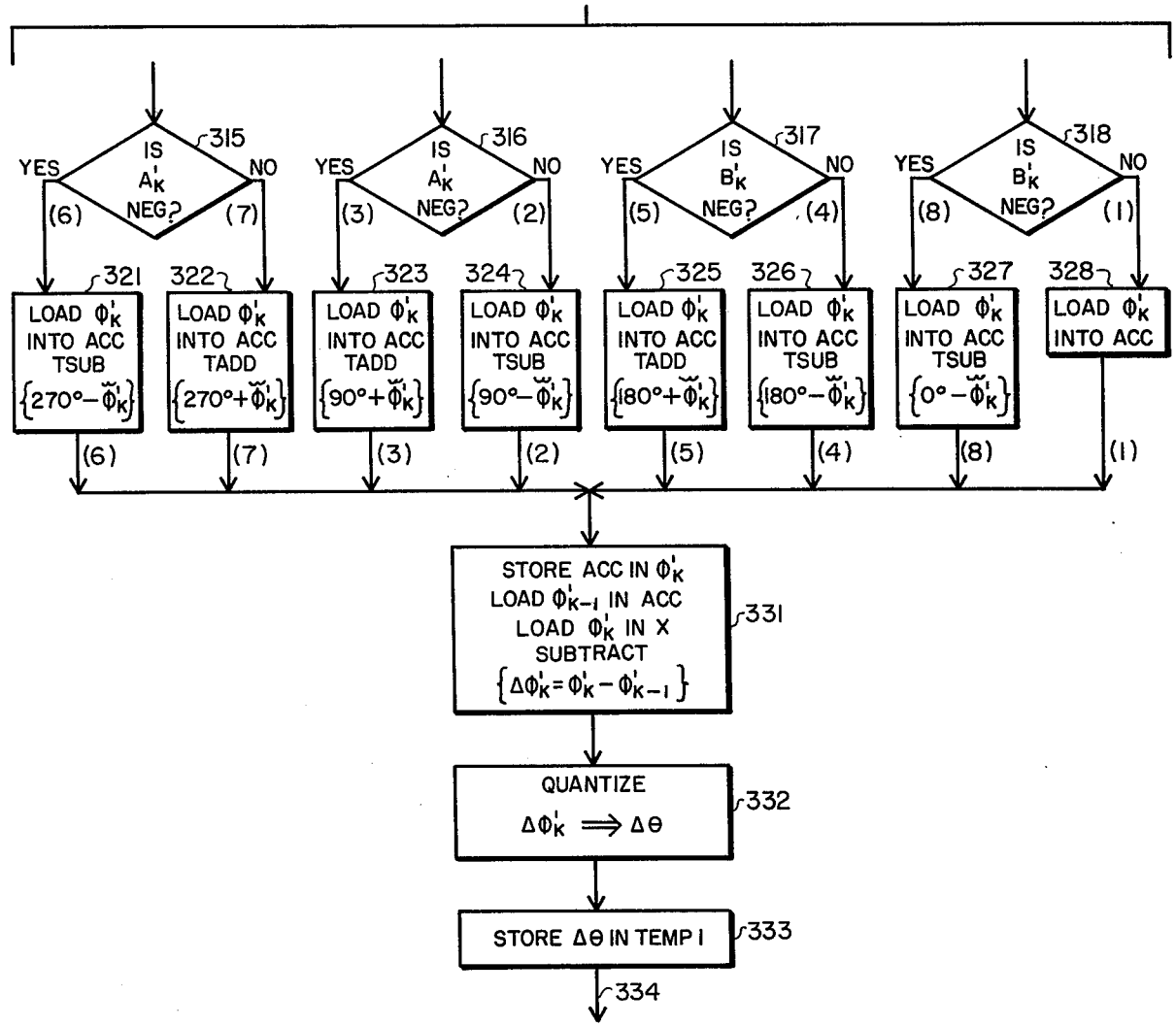

The detailed program in FIGS. 17A and 17B operates on the current ($k^{th}$) equalized sample component word $A'_k$ and $B'_k$ produced by the program steps in FIGS. 16A and 16B to produce updated values of the phase angle $\phi'_k$, the phase difference $\Delta\phi'_k$ and the quantized phase angle $\Delta\theta$. In accordance with this invention, the angle $\phi'_k$ is determined by obtaining a measure of the angle which is the arc tangent ($\tan^{-1}$) of the smaller of $/A'_k/B'_k/$ or $/B'_k/A'_k/$, incremental values of the arc tangents being stored in a tangent look-up table in ROM, and adjusting this angle representation to be in the proper quadrant to be the phase angle $\phi'_k$. The philosophy of the operation of the program in FIGS. 17A and 17B is summarized in FIG. 20 and Table II, where FIG. 20 is a graphic representation of what is started in columns 1 – 4 of this Table II. Briefly, the polarity of the sum $A'_k + B'_k$ (represented by uncircled + and — in FIG. 20) indicates which one of four adjacent octants contains the phase angle $\phi'_k$. The polarity of the difference $A'_k - B'_k$ (represented by the + and — in circles in FIG. 20) indicates the same thing as does the sum $A'_k + B'_k$ when one of these representations is rotated by 90°. Thus, the polarities of $A'_k + B'_k$ and $A'_k - B'_k$ together indicate which one of two adjacent octants contains the phase angle $\phi'_k$. Finally, the polarities of $A'_k$ and $B'_k$ (represented by A+ or A— and B+ or B— in FIG. 20) separately indicate which one of two opposing octants contains the angle $\phi'_k$. Together, the polarities of $A'_k + B'_k$, of $A'_k - B'_k$, and of $A'_k$ or $B'_k$ uniquely identify the octant containing the phase angle $\phi'_k$. Since the angles $\sigma_1$ and $\sigma_2$ in FIG. 21 correspond to representative values of $\tan^{-1} B'_{k1}/A'_{k1}$ and $\tan^{-1} A'_{k2}/B'_{k2}$ it is then only necessary that the measure of the angle obtained from the ROM tangent look-up table be added to or substracted from the product m (90°), where m is an integer which varies from 0 to +3, to obtain $\phi'_k$.

Referring now to the detailed program in FIGS. 17A and 17B, program block 278 causes the old contents of memory location $\phi'_k$ to be stored in the memory location $\phi'_{k-1}$ for providing an indication of the delayed phase angle. Blocks 279 - 280 then form the sum $A'_k + B'_k$ which is stored in TEMP 1 and tested in decision block 281 to determine whether the polarity of this signal is negative. It should be remembered that throughout the program in FIGS. 17A and 17B, that only one path is traversed during a particular symbol interval. If the answer is NO, the desired phase angle $\phi'_k$ is known to be in octant 1, 2, 3 or 8 and program block 283 produces the difference signal $A'_k - B'_k$. If the answer in test block 281 is in the affirmative, the YES path indicates that the desired angle $\phi'_k$ is in the octant 4, 5, 6 or 7 and causes block 284 to also produce the difference signal $A'_k - B'_k$.

Each of the decision blocks 288 and 289 tests whether this difference signal $A'_k - B'_k$ is negative. If the answer is in the affirmative, the YES path from decision block 289 further narrows the octant containing $\phi'_k$ to be either octant 4 or 5 and indicates that the absolute value of $A'_k$ is greater than the absolute value of $B'_k$. Conversely, the no path from decision block 289 indicates that the angle $\phi'_k$ is in either octant 6 or 7 and that the absolute value of $B'_k$ is greater than the absolute value of $A'_k$. In a similar manner, the YES path from decision block 288 indicates that the angle is in octant 2 or 3, whereas the NO path therefrom indicates that it is in octant 1 or 8.

Program block 291 produces the quotient $A'_k/B'_k$ which is employed by block 292 to address the tangent look-up table to extract a measure of $\tan^{-1}|A'_k/B'_k|$ and store it in the memory location $\phi'_k$. Program step 293 and decision block 295 again test whether the sum $A'_k + B'_k$ is negative for again indicating whether the recently obtained measure of $\phi'_k$ of the angle $\phi'_k$ is in the quadrants 2 or 3 or is in quandrants 6 or 7. Blocks 296 and 297 operate in a similar manner for obtaining a measure $\phi'_k$ of $\tan^{-1}$ of $\tan^{-1}|B'_k/A'_k|$ The YES and NO paths from decision block 300 indicate whether the recently obtained measure of angle $\phi'_k$ is in quadrant 4 or 5 or is in quadrant 1 or 8, respectively.

As indicated in the columns 1, 4, and 5 of Table II, it is now only necessary to add this angle measure to or substract it from an integral multiple of 90° to obtain the desired phase angle $\phi'_k$. The program blocks 305 – 308 each loads a requisite multiple of 90°, which are a part of instruction words in order to conserve memory, into X for facilitating performing these adjustments of the angle measure. Decision block 315 and 316 and decision blocks 317 and 318 in the four paths test whether $A'_k$ and $B'_k$, respectively, are negative. The paths from these decision blocks specify the particular octant containing the desired phase angle $\phi'_k$ as is indicated in parentheses in FIG. 17B. The program blocks 321 – 328 cause the angle measure that is temporarily stored in memory location $\phi'_k$ to be loaded into the accumulator and added to or substracted from (where TSUB and TADD designate two's complement substraction and two's complement addition) the specified angles in X for producing the desired angle $\phi'_k$. Assuming that this phase angle $\phi'_k$ is represented by an 8-bit digital word, the angle $\phi'_k$ here can have possible values that vary as multiples of 1.406°. The phase difference $\Delta\phi'_k$ is obtained in program block 331. In a passband equalizer of a data system where the carrier frequency is no equal to an integral mulitple of the symbol rate, the phase angle $\phi'_k$ formed by the blocks 321 – 328 includes an additional constant phase angle term $K\omega_c T$ where $k$ is related to the sample, $\omega_c$ is the carrier radian frequency, and T is the symbol interval. In the example here where the carrier frequency is 1800 Hz and the symbol rate is 1600 symbols per second, there are 9/8 cycles of carrier per symbol interval. Thus, $\omega_c T$ here is 360°/8 = 45° per symbol. It has been determined that this carrier phase term $\omega_c T$ must be in the phase difference $\Delta\phi'_k$ formed by step 331 for the equalizer to operate properly. In the passband case, this criterion is satisfied since $$\Delta\phi'_k = \{(\phi'_k + k\omega_c T) - (\phi'_{k-1} + (k-1)(\omega_c T)\} = \phi'_k - \phi'_{k-1} + \omega_c T.$$

This is not true, however, in the baseband case where neither angle $\phi'_k$ nor angle $\phi'_{k-1}$ contains a carrier term $K\omega_c T$. It is necessary therefore in the baseband program for this example that block 331 add a constant phase angle of $\omega_c T = 45°$ to $\Delta\phi'_k$ formed thereby. The 8-bit word, for example, produced by step 331 and defining the phase difference $\Delta\phi'_k$ is quantized in program step 332 by truncating this word to its 3MBS's which cause it to be an odd multiple of 22.5° according to the coding scheme illustrated in FIG. 2 and Table I, column 4. In this quantizing step 332, the 3 MSB's in the block 331 output are shifted to form a new 8-bit word $\Delta\theta$ from block 332 having its 3 MBS's and 2 LSB's all "0". The constant 45° angle term $\omega_c T$ is added by block 331 in the baseband case by adding a "1" to the LSB of these 3 MSB's prior to quantizing.

Figure 18:
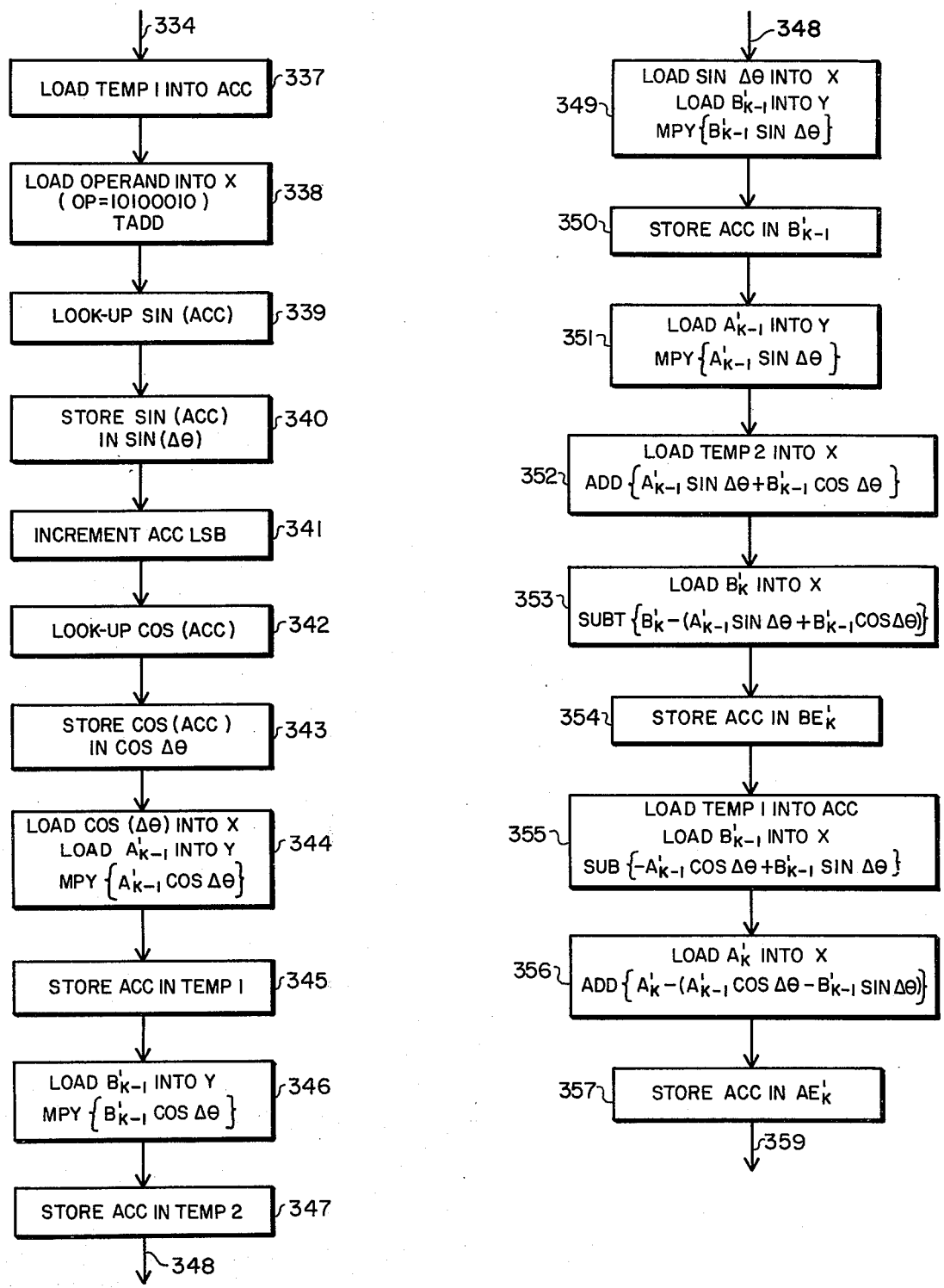

The detailed program in FIG. 18 operates to form new values of the error signals $AE'_k$ and $BE'_k$. This is accomplished by obtaining values of $\sin \Delta\theta$ and $\cos \Delta\theta$ and then performing mathematical operations on them and other signals in RAM memory locations. In one embodiment of this invention, the eight values of $\sin \Delta\theta$ and the eight values of $\cos \Delta\theta$ in Table I, columns 5 and 6, respectively, are stored in associated ROM look-up tables, outputs of each being hard-wired through gate circuits to associated RAM memory locations $\sin \Delta\theta$ and $\cos \Delta\theta$. Thus, it is only necessary to correctly address a memory location in each of these sine and cosine look-up tables to place the desired words in the $\sin \Delta\theta$ and $\cos \Delta\theta$ memory locations. The architecture of the $\tan^{-1}$ look-up table is similar.

Referring now to FIG. 18, program steps 337 and 338 add the constant (OPERAND) 8-bit word 10100010, which is part of the instruction word, to the angle $\Delta\theta$ to form an 8-bit address word for addressing a particular one of the eight memory locations in either the sine or cosine look-up table in ROM 212. The LSB is, for example, either a 0 or a 1 for addressing the sine and cosine look-up tables, respectively. The 3 bits corresponding to $\Delta\theta$ in this address designate the particular memory location in the look-up table. This instruction in the ACC register is carried out in program step 339 and stored by step 340 in RAM memory location $\sin \Delta\theta$. The LSB in the accumulator is then incremented in step 341 so that the cosine of $\Delta\theta$ is extracted from the associated look-up table and stored in memory location $\cos \Delta\theta$ as specified by program steps 342 – 343. The subsequent program steps 343 – 357 in FIG. 18 cause the contents of designated memory locations to be mathematically operated on as is specified here and described above to produce the error signals $BE'_k$ and $AE'_k$ in steps 353 and 356 which are stored in the corresponding memory locations.

Figure 19:
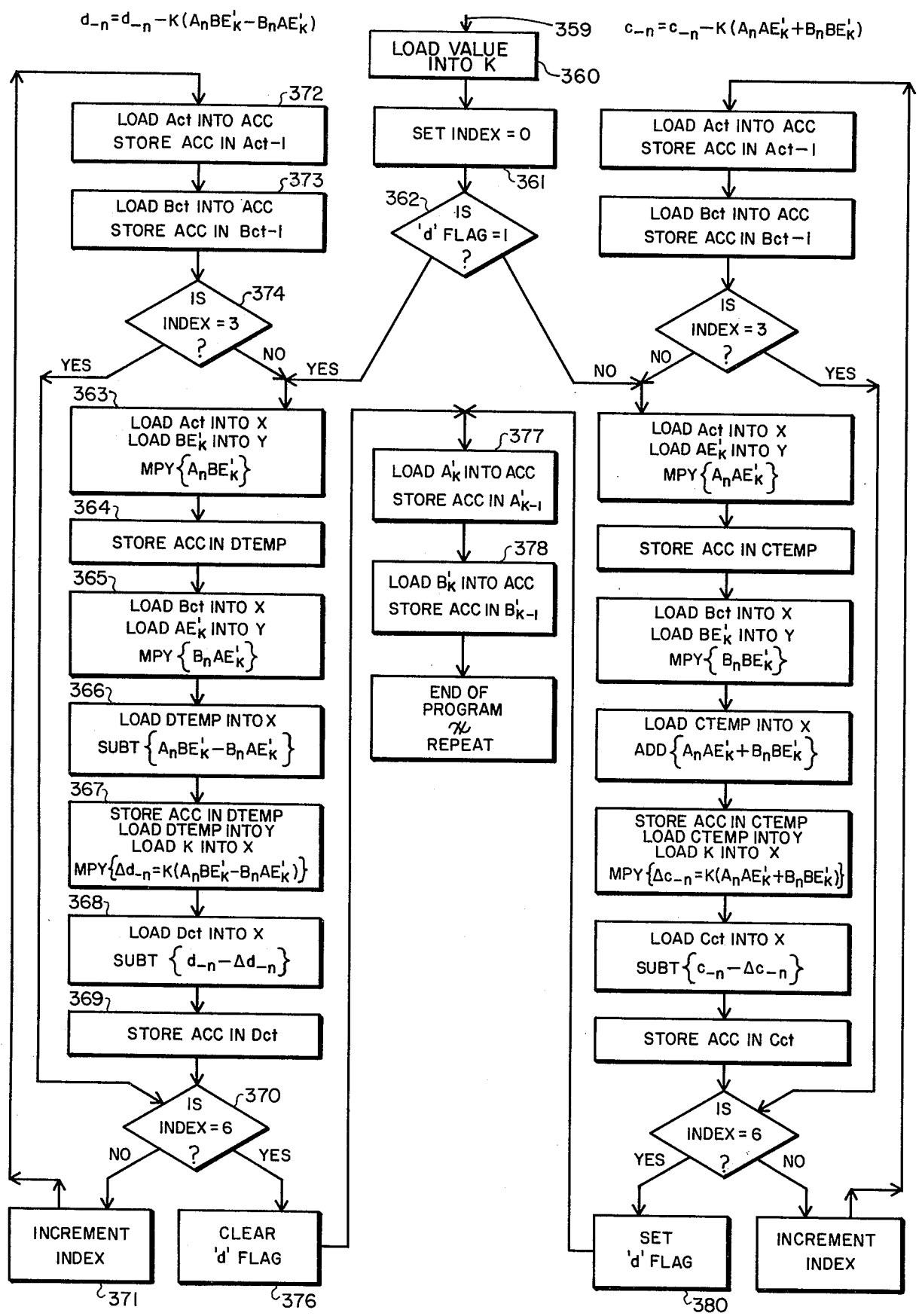

The detailed flow chart in FIG. 19 defines the operations that are performed in computing updated values of either $d_{-n}$ or $c_{-n}$ during a $k^{th}$ symbol interval for use in computing equalized signal component words $A'_k$ and $B'_k$ (see FIGS. 16A and 16B) in the next symbol interval. Stated differently, this program causes updated values of tap gains $c_{-n}$ to be computed during one symbol interval and causes updated values of $d_{-n}$ to be computed during the next symbol interval, i.e., updated values of $c_{-n}$ and $d_{-n}$ are computed during alternate symbol intervals. Thus, the $c_{-n}$ and $d_{-n}$, for example, that are used to compute $A'_k$ in the $k^{th}$ symbol interval were determined during the $k-1^{th}$ and $k-2^{th}$ symbol intervals, respectively.

A value of the constant K is initially loaded into the memory location K in step 360 of FIG. 19. The index register 202 is then set to zero in step 361. A test is performed in decision block 362 to determine whether a "d" flag = 1. If the answer is in the affirmative, the YES path is taken to compute updated values of $d_{-n}$ during this symbol interval. If the answer is in the negative, the NO path is taken to compute updated values of $c_{-n}$. Assuming that the "d" flag is one, block 363 loads the contents of the $A_n$ memory having the same 3 LSB's address as the contents of the index counter 202 into X and the contents of memory location $BE'_k$ in Y. The product signal is produced in ACC and stored in DTEMP by block 364. In a similar manner, block 365 loads the contents of the $B_n$ memory with the same 3 LSB's address as the contents of the index counter into X and the value of $AE'_k$ into Y and operates to produce the product signal in ACC. The difference between these product signals is formed in block 366 and multiplied by the constant K for forming the incremental tap gain $\Delta d_{-n}$ in block 367. This new value of $\Delta d_{-n}$ is subtracted in block 368 from the old value of $d_{-n}$ to produce the updated value of $d_{-n}$ in ACC, which is then stored by step 369 in the $d_{-n}$ memory location having the same address as the contents of the index register. Decision block 370 tests whether the contents of the index register are equal to 6 since this program path is traversed for all 6 values of $d_{-n}$, where $n \neq 0$. If the answer is in the negative, the NO path causes block 371 to increment the index counter 202. Program steps 372 and 373 then cause the contents of the $A_n$ and $B_n$ memory locations having 3 LSB's of address that are the same as the contents of the index counter to be entered into the corresponding $A_n$ and $B_n$ memory locations having 3 LSB's that are one bit less than the contents of the index counter 202. Decision block 374 tests to determine whether the contents of the index counter are 011 or 3, which corresponds to the tap gain $d_o$ associated with the center tap of a hypothetical delay line. Since the tap signals for the center taps are fixed, there are no memory locations in $c_{-n}$ and $d_{-n}$ corresponding to addresses 011. If the answer is in the negative, the $d_{-n}$ computation path is again traversed to compute an updated value of another tap gain $d_{-n}$. If the answer is in the affirmative, the $d_{-n}$ computation path is bypassed and the program jumps to step 370 which tests whether the contents of the index counter 202 are equal to 6. When the answer to the test in step 370 is in the affirmative, block 376 causes the "d" flag to be cleared such that the "d" $\neq$ 1. Program steps 377 and 378 cause the current values of $A'_k$ and $B'_k$ to be loaded into the memory locations $A'_{k-1}$ and $B'_{k-1}$, respectively, for use in updating values of $AE'_k$ and $BE'_k$ in the next symbol interval. The operation in computing values of the tap gains $c_{-n}$ is similar except that when the contents of the index register 202 are equal to 6, block 380 sets the "d" flag such that "d" = 1.

The center tap gain vector is taken to be $(c_o, d_o) = (1, 0)$ for convenience in this example where $K = K_o$. Any other vector satisfying $c_o^2 - d_o^2 = 1$ can be used without affecting convergence of the equalizer at all. However, if $c_o^2 + d_o^2 \neq 1$, then the convergence rate of the equalizer is changed, as well as the level of the equalized signal. The situation $c_o^2 + d_o^2 = 2$, where $K = K_o$ is equivalent to $c_o^2 + d_o^2 = 1$, where $K = 2K_o$, except that the equalizer output is $\sqrt{2}$ times larger in the former case.

What is claimed is:

1. An adaptive equalizer for a phase-modulated data transmission channel causing distorted signals, comprising:

delay line means receiving distorted signals and having pairs of output tap lines at synchronously equally spaced intervals that are determined by the transmission rate of data symbols traversing the channel, associated tap lines of each pair passing in-phase and quadrature-phase tap signals, one of said pair of tap lines being principal tap lines for passing principal tap signals;

first weighting means for weighting tap signals from each pair of tap lines, other than the principal tap lines, with associated pairs of in-phase and quadrature-phase tap gains that are updated at least periodically for producing a pair of in-phase and a pair of quadrature-phase weighted tap signals associated with each pair of tap lines other than the principal tap lines, wherein each pair of in-phase weighted tap signals is a measure of the associated in-phase tap signal weighted by the associated in-phase tap gain and the associated quadrature-phase tap signal weighted by the associated quadrature-phase tap gain, and wherein each pair of quadrature-phase weighted tap signals is a measure of the associated in-phase tap signal weighted by the associated quadrature-phase tap gain and the associated quadrature-phase tap signal weighted by the associated in-phase tap gain;

second weighting means for weighting the principal tap signals with constants;

first combining means combining all of the in-phase and quadrature-phase weighted tap signals, including the weighted principal tap signals, for producing an equalized signal;

error signal producing means responsive to the output of said first combining means for producing, during at least some symbol intervals, common in-phase and quadrature-phase components of an error signal that is a measure of the difference between the signal vector equalized during one symbol interval and a reference vector which is the signal vector equalized during the prior symbol interval after the latter equalized signal vector is rotated by a phase angle that is proportional to a quantized value of the difference between the phases of the signals equalized during the one and the prior symbol intervals; and correlation means responsive to tap signals from pairs of tap lines other than the principal tap lines and to the in-phase and quadrature-phase error signals for producing updated values of the in-phase and quadrature-phase tap gains.

2. The equalizer according to claim 1 wherein said correlation means produces updated values of at least one plurality of the pluralities of in-phase and quadrature-phase tap gains during a symbol interval where differential changes produced in the in-phase tap gains are a function of the sum of the associated in-phase tap signal adjusted by the in-phase error signal and the associated quadrature-phase tap signal adjusted by the quadrature-phase error signal, and where differential changes produced in the quadrature-phase tap gains are a function of the difference between the associated in-phase tap signal adjusted by the quadrature-phase error signal and the associated quadrature-phase tap signal adjusted by the in-phase error signal.

3. The equalizer according to claim 2 wherein said error signal producing means produces, during each symbol interval: a new in-phase error signal that is a measure of the difference between the in-phase component of a signal equalized in one symbol interval and the resultant difference between the product of the cosine of the quantized phase difference and the in-phase component of a signal equalized in the prior symbol interval and the product of the sine of the quantized phase difference and the quadrature-phase component of the signal equalized in the prior symbol interval; and a new quadrature-phase error signal that is a measure of the difference between the quadrature-phase component of the signal equalized in the one symbol interval and the resultant sum of the product of the sine of the quantized phase difference and the in-phase component of the signal equalized in the prior symbol interval, and the product of the cosine of the quantized phase difference and the quadrature-phase component of the signal equalized in the prior symbol interval.

4. The equalizer according to claim 3 wherein said correlation means comprises, in relation to each pair of tap lines, first and second pairs of multipliers and first and second combining circuits combining the outputs of associated pairs of multipliers, a first multiplier of said first pair receiving an associated in-phase tap signal and the common in-phase error signal, the other multiplier of said first pair receiving the associated quadrature-phase tap signal and the common quadrature-phase error signal, said first combining circuit combining the product output signals of the multipliers of the associated first pair for producing, in one symbol interval, a signal that is proportional to an associated in-phase incremental tap gain, and including second combining means combining this in-phase incremental tap gain produced during this one symbol interval with the in-phase tap gain produced during the prior symbol interval to produce an associated updated in-phase tap gain in this same one symbol interval; one mulitplier of said second pair receiving the associated in-phase tap signal and the common quadrature-phase error signal, the other multiplier of said second pair receiving the associated quadrature-phase tap signal and the common in-phase error signal, the second combining circuit combining the product output signals of said multipliers of said second pair for producing in one symbol interval a signal that is proportional to an associated quadrature-phase incremental tap gain, and including third combining means combining this quadrature-phase incremental tap gain produced during this one symbol interval with the associated quadrature-phase tap gain produced during the prior symbol interval to produce an associated updated quadrature-phase tap gain in this one symbol interval.

5. The equalizer according to claim 4 wherein said first weighting means comprises, in relation to each pair of tap lines, third and fourth pairs of multipliers for producing the associated pairs of in-phase and pairs of quadrature-phase weighted tap signals, respectively, one multiplier of said third pair receiving the associated in-phase tap signal and the associated in-phase updated tap gain, the other multiplier of said third pair receiving the associated quadrature-phase tap signal and the associated quadrature-phase updated tap gain; one mulitplier of said fourth pair receving the associated quadrature-phase tap signal and the associated in-phase updated tap gain, and the other multiplier of said fourth pair receiving the associated in-phase tap signal and the associated quadrature-phase updated tap gain.

6. Apparatus for adaptive equalization of distorted differentially phase-modulated data signals, comprising:
   means responsive to a received distorted data signal for converting it into its in-phase and quadrature-phase vector components;
   first and second synchronously tapped delay line means receiving associated in-phase and quadrature-phase vector components from said converting means, associated tap lines of said delay line means being arranged in pairs of in-phase and quadrature-phase tap lines, one pair of tap lines being principal tap lines;
   a plurality of correlation means each of which is associated with a different pair of tap lines, except the principal tap lines, each correlation means being responsive to associated in-phase and quadrature-phase tap signals and common in-phase and common quadrature-phase error signals for producing associated in-phase and quadrature-phase tap gains, values of at least one of these types of tap gains being updated during at least some symbol intervals, updated values of the other type of tap gains being produced in symbol intervals which may be other than said some symbol intervals;
   a plurality of first weighting means each of which is associated with a different pair of tap lines, except the principal tap lines, each first weighting means being responsive to associated in-phase and quadrature-phase tap signals and associated in-phase and quadrature-phase tap gains from an associated correlation means for producing a pair of in-phase weighted tap signals which are measures of the associated in-phase tap signal weighted by the associated in-phase tap gain and of the associated quadrature-phase tap signal weighted by the associated quadrature-phase tap gain, and producing a pair of quadrature-phase weighted tap signals that are measures of the associated in-phase tap signal weighted by the associate quadrature-phase tap gain and the associated quadrature-phase tap signal weighted by the associated in-phase tap gain;
   second weighting means for weighting the principal tap signals with constant in-phase and constant quadrature-phase tap gains;
   first combining means combining all of the in-phase and quadrature-phase weighted tap signals, including the weighted principal tap signals, for producing an equalized signal during a particular symbol interval of the data signal; and
   error signal producing means responsive to the equalized signal from said first combining means for producing, during at least some symbol intervals, the common in-phase and common quadrature-phase error signals which are the corresponding components of an error signal vector that is a measure of the difference between the signal vector equalized during one symbol interval and a reference vector which is a signal vector equalized in a prior symbol interval after the latter prior equalized vector signal is rotated by a phase angle that is a measure of the difference between the phases of the signals equalized in the one and the said prior symbol intervals.

7. The equalizer according to claim 6 wherein said converting means produces sampled signal components and wherein each of said correlation means produces an updated value of at least one of the associated in-phase and quadrature-phase tap gains during a symbol interval, where the differential change produced in the associated in-phase tap gain is a function of the sum of the associated in-phase tap signal adjusted by the common in-phase error signal and the associated quadrature-phase tap signal adjusted by the quadrature-phase common error signal, and where the differential change produced in the associated quadrature-phase tap gain is a function of the difference between the associated in-phase tap signal adjusted by the quadrature-phase common error signal and the associated quadrature-phase tap signal adjusted by the in-phase common error signal.

8. The equalizer according to claim 7 wherein said error signal producing means produces, during each symbol interval: a new in-phase error signal that is a measure of the difference between the in-phase component of a signal equalized in one symbol interval and the resultant difference between the product of the cosine of a quantized value of the phase difference and the in-phase component of a signal equalized in the said prior symbol interval, and the product of the sine of the quantized phase difference and the quadrature-phase component of the signal equalized in the said prior symbol interval; and a new quadrature-phase error signal that is a measure of the difference between the quadrature-phase component of the signal equalized in the one symbol interval and the resultant sum of the product of the sine of the quantized phase difference and the in-phase component of the signal equalized in the said prior symbol interval, and the product of the cosine of the quantized phase difference and the quadrature-phase component of the signal equalized in the said prior symbol interval.

9. The equalizer according to claim 8 wherein each of said correlation means comprises first and second pairs of multipliers and first and second combining circuits combining the outputs of associated pairs of multipliers, one multiplier of said first pair receiving an associated in-phase tap signal and the common in-phase error signal, the other multiplier of said first pair receiving the associated quadrature-phase tap signal and the quadrature-phase common error signal, said first combining circuit combining the product output signals of the multipliers of the associated first pair for producing in one symbol interval a signal that is proportional to an associated in-phase incremental tap gain, and including second combining means combining this in-phase incremental tap gain produced during this one symbol interval with the associated in-phase tap gain produced during a prior symbol interval to produce an associated updated in-phase tap gain in this same one symbol interval; one multiplier of said second pair receiving the associated in-phase tap signal and the quadrature-phase common error signal, the other multiplier of said second pair receiving the associated quadrature-phase tap signal and the in-phase common error signal, the second combining circuit combining the product output signals of the multipliers of the associated second pair for producing in one symbol interval a signal that is proportional to an associated quadrature-phase incremental tap gain and including third combining means combining this quadrature-phase incremental tap gain produced during this one symbol interval with the associated quadrature-phase tap gain produced during a prior symbol interval to produce an associated updated quadrature phase tap gain in this one symbol interval.

10. The equalizer according to claim 9 wherein each of said first weighting means comprises third and fourth pairs of multipliers for producing associated pairs of in-phase and associated pairs of quadrature-phase weighted tap signals, respectively, one multiplier of said third pair receiving the associated in-phase tap signal and the associated in-phase updated tap gain, the other multiplier of said third pair receiving the associated quadrature-phase tap signal and the associated quadrature-phase updated tap gain; the one multiplier of said fourth pair receiving the associated quadrature-phase tap signal and the associated in-phase updated tap gain, and the other multiplier of said fouth pair receiving the associated in-phase tap signal and the associated quadrature-phase updated tap gain.

11. Apparatus according to claim 6 wherein said converting means produces in-phase and quadrature-phase baseband signal components.

12. Apparatus according to claim 11 wherein said converting means produces sampled signal components.

13. Apparatus according to claim 6 wherein said converting means produces passband in-phase and quadrature-phase signal components.

14. Apparatus according to claim 13 wherein said converting means produces sampled signal components.

15.. A system for equalizing a distorted differentially phase-modulated data signal, comprising in combination:

means converting the distorted signal into sampled digital words corresponding to in-phase and quadrature-phase components $A_k$ and $B_k$, respectively, thereof in one ($k^{th}$) symbol interval; and means responsive to the sampled components $A_k$ and $B_k$ of the distorted signal for providing in the $k^{th}$ symbol interval in-phase and quadrature-phase components $A'_k$ and $B'_k$ of the equalized signal satisfying the relationships:

$$A'_k = \Sigma_n (c_{-n} A_{k+n} - d_{-n} B_{k+n}) + (C_o A_{k+o} - d_o B_{k+o})$$
$$n \neq 0$$

and $$B'_k = \Sigma_n (d_{-n} A_{k+n} - c_{-n} B_{k+n}) + (d_o A_{k+o} + c_o B_{k+o})$$
$$n \neq 0$$

where A and B designated in-phase and quadrature-phase signal components, respectively; n is a selected variable having values which are integers; $A_{k+n}$ and $B_{k+n}$ designate components of unequalized signal samples from different designated symbol intervals; $A_{k+n}$ and $B_{k+n}$, where $n = 0$, designate components of unequalized signals from a particular symbol interval and which are reference values; $c_o$ and $d_o$ are constant tap gains; $c_{-n}$ and $d_{-n}$ are in-phase and quadrature-phase tap gain signals (where n ≠ 0), each of which is updated by said last-named means during at least some symbol intervals and which satisfy associated relationships $$c_{-n} \text{ (updated)} = c_{-n} \text{ (old)} + \Delta c_{-n} \text{ (new)}, n \neq 0$$

and $$d_{-n} \text{ (updated)} = d_{-n} \text{ (old)} + \Delta d_{-n} \text{ (new)}, n \neq 0$$

$\Delta c_{-n}$ and $\Delta d_{-n}$ are new incremental in-phase and quadrature-phase tap gain signals (where n ≠ 0), each of which is produced by said last-named means during at least some symbol intervals and which satisfy associated relationships $$\Delta c_{-n} = -I (A_{k+n} AE'_k + B_{k+n} BE'_k)$$

and $$\Delta d_{-n} = -K (A_{k+n} BE'_k - B_{k+n} AE'_k);$$

K is a constant; $AE'_k$ and $BE'_k$ are in-phase and quadrature-phase components of an error signal vector and are produced by said last-named means during at least some symbol intervals and which satisfy associated relationships $$AE'_k = A'_k - (A'_{k-1} \cos \Delta\theta - B'_{k-1} \sin \Delta\theta)$$

and $$BE'_k = B'_k - (A'_{k-1} \sin \Delta\theta + B'_{k-1} \cos \Delta\theta);$$

$A'_k$, $B'_k$, and $A'_{k-1}$, $B'_{k-1}$ here are component signals equalized during a specified ($k^{th}$) symbol interval and the prior K-$1^{th}$) symbol interval; and $\Delta\theta$ is a quantized value of the difference between the phases of equalized signals in the $k^{th}$ and k-$1^{th}$ symbol intervals.

16. The system according to claim 15 wherein said last named-means produces new in-phase and quadrature-phase error signals $AE_k$ and $BE'_k$ during each current ($k^{th}$) symbol interval.

17. The system according to claim 16 wherein said last named-means produces new incremental tap gains $\Delta c_{-n}$ during particular symbol intervals, and produces new incremental tap gains $\Delta d_{-n}$ during particular symbol intervals, and produces new incremental tap gains $\Delta d_{-n}$ during other symbol intervals which are different from said particular symbol intervals.

18. The system according to claim 17 wherein said last named-means produces updated tap gains $c_{-n}$ and $d_{-n}$ during said particular and said other symbol intervals, respectively.

19. The system according to claim 15 wherein said last named-means produces new incremental tap gains $\Delta c_{-n}$ and updated tap gains $c_{-n}$ during alternate symbol intervals, and produces new incremental tap gains $\Delta d_n$ and updated tap gains $d_{-n}$ during the symbol intervals which are other than the specified alternate symbol intervals.

20. Apparatus for adaptively establishing in-phase and quadrature-phase tap gains, other than principal tap gains, for associated in-phase and quadrature-phase weighting circuits in a transversal adaptive equalizer providing in-phase and quadrature-phase tap signals to associated weighting circuit and also providing such principal tap signals, weighted principal tap signals, and other weighted tap signals from the weighting circuits being combined for effecting equalization of distorted differentially phase-modulated data signals to produce equalized signals, comprising:

means responsive to an equalized signal that is equalized in one symbol interval for producing common in-phase and quadrature-phase components of an error signal that is a measure of the difference between the equalized signal vector equalized in the one symbol interval and a reference vector which is the equalized signal vector that is equalized in a prior symbol interval after the latter equalized signal vector is rotated by a phase angle that is proportional to a quantized value of the difference between the phases of the signals equalized during the one and the said prior symbol intervals; and correlator means correlating in-phase and quadrature-phase tap signals, other than the principal tap signals, and the common error signal components from said first-named means for producing the specified in-phase and quadrature-phase tap gains, updated values of at least one type of tap gains being produced in at least some symbol intervals, updated values of the other type of tap gains being produced in symbol intervals which may be other than said some symbol intervals.

21. Apparatus according to claim 20 wherein said prior symbol interval is the symbol interval adjacent to and preceding said one symbol interval.

22. In an adaptive transversal equalizer for equalizing differentially phase-modulated data signals having symbol intervals and being distorted by a transmission channel, the equalizer including tapped delay line means providing a plurality of tap signal vectors of which selected ones are combined with at least one error signal vector for providing a plurality of tap gain vectors, particular tap gain vectors being combined with various selected tap signal vectors for producing a plurality of weighted tap signal vectors that are combined with a selectively weighted principal tap signal vector to produce an equalized signal vector, the improvement comprising:

means for producing, during at least some symbol intervals, a common error signal vector that is combined with all selected tap signal vectors, except the principal tap signal vector, for producing the tap gain vectors, the common error signal vector being a measure of the difference between the equalized signal vector that is equalized during one symbol interval and a reference vector which is the equalized signal vector that is equalized during a prior symbol interval after this prior equalized signal vector is rotated by a phase angle that is proportional to the quantized value of the difference between the phases of the equalized signal vectors that are equalized during the one and the prior symbol intervals.

23. An improved adaptive transversal equalizer according to claim 22 wherein the said prior symbol interval is the symbol interval adjacent to and preceding said one symbol interval.

24. In an adaptive equalizer in a data set, the method of performing automatic equalization of distorted differentially phase-modulated data signals that have symbol intervals, comprising the steps of:

converting a distorted data signal to in-phase and quadrature-phase components thereof;

producing pluralities of pairs of in-phase and quadrature-phase tap signals that are synchronously equally spaced apart in time intervals that are determined by the transmission rate of data symbols traversing the channel, tap signals other than a pair of principal tap signals being selected tap signals;

combining tap signals of each selected pair thereof with associated pairs of in-phase and quadrature-phase tap gains, values of at least the in-phase tap gains being updated during at least some symbol intervals, updated values of the quadrature-phase tap gains being produced in symbol intervals which may be other than said some symbol intervals, for producing pairs of in-phase and pairs of quadrature-phase weighted tap signals, wherein each pair of in-phase weighted tap signals is a measure of the associated in-phase tap signal weighted by the associated in-phase tap gain and the associated quadrature-phase tap signal weighted by the associated quadrature-phase tap gain, and wherein each pair of quadrature-phase weighted tap signals is a measure of the associated in-phase tap signal weighted by the associated quadrature-phase tap gain and the associated quadrature-phase tap signal weighted by the associated in-phase tap gain;

combining each principal tap signal with a pair of in-phase and quadrature-phase constant principal tap gains to produce corresponding pairs of in-phase and quadrature-phase weighted principal tap signals;

combining all of the in-phase and quadrature-phase weighted tap signals, including the weighted principal tap signals, for producing an equalized data signal;

producing common in-phase and common quadrature-phase components of an error signal that is a measure of the difference between the equalized signal vector that is equalized during one symbol interval and a reference vector, which is the equalized signal vector that is equalized during the prior symbol interval, after the latter equalized signal vector is rotated by a phase angle that is proportional to a quantized value of the difference between the phases of the equalized signals that are equalized during the one and the prior symbol intervals;

combining selected in-phase and quadrature-phase tap signals with the common in-phase and common quadrature-phase error signals, respectively, for producing, during at least some symbol intervals, updating values of in-phase tap gains;

combining selected quadrature-phase and in-phase tap signals with the common in-phase and common quadrature-phase error signals, respectively, for producing during symbol intervals which may be different from the same symbol intervals updating values of quadrature-phase tap gains; and combining updating values of tap gains with existing values of associated tap gains for producing updated values thereof.

25. The method according to claim 24:

wherein said third to last-named combining step includes the step of:

forming new in-phase incremental tap gains, each of which is a function of the sum of the associated in-phase selected tap signal and the in-phase common error signal and the product of the associated quadrature-phase selected tap signal and the quadrature-phase common error signal;

wherein said second to last-named combining step includes the step of forming new quadrature-phase incremental tap gains, each of which is a function of the difference between the product of the associated in-phase selected tap signal and the quadrature-phase common error signal and the product of the associated quadrature-phase selected tap signal and the in-phase common error signal;

and wherein said last-named combining step includes the steps of:

combining new in-phase incremental tap gains formed during a symbol interval with corresponding in-phase tap gains produced during a prior symbol interval to produce associated updated in-phase tap gains; and combining new quadrature-phase incremental tap gains formed during a symbol interval with corresponding quadrature-phase tap gains produced during a prior symbol interval to produce associated updated quadrature phase tap gains.

26. The method according to claim 24 wherein said last-named producing step comprises, during each symbol interval, the steps of:

producing a quantized value of the difference between the phase angles of the signals equalized during one and a prior symbol interval;

producing measures of the sine and cosine of the quantized phase angle;

forming the various products of both the sine and cosine of the quantized phase angle and both of the in-phase and quadrature-phase components of the equalized signal that is equalized during the prior symbol interval;

forming the difference between the in-phase component of the signal equalized in the one symbol interval and the resultant difference between the product of the cosine of the quantized phase difference and the in-phase component of the signal equalized in the prior symbol interval, and the product of the sine of the quantized phase difference and the quadrature-phase component of the signal equalized in the prior symbol interval, which is the common in-phase error signal; and forming the difference between the quadrature-phase component of the signal equalized in the one symbol interval and the resultant sum of the product of the sine of the quantized phase difference and the in-phase component of the signal equalized in the prior symbol interval, and the product of the cosine of the quantized phase difference and the quadrature-phase component of the signal equalized in the prior symbol interval, which is the common quadrature-phase error signal.

27. In the machine method of adaptive equalization of differentially phase-modulated data signals for a sampled data modem where the data signals have symbol intervals and are distorted by a transmission channel, the method including the various steps of producing a plurality of pairs of in-phase and quadrature-phase sampled tap signals of which selected ones are combined with at least one error signal for providing a plurality of associated pairs of in-phase and quadrature-phase tap gains, particular pairs of tap gains being combined with associated pairs of selected tap signals for producing pluralities of weighted tap signals that are combined with selectively weighted in-phase and quadrature-phase principal tap signals to produce an equalized signal vector, the improvement comprising the step of:

producing, during at least some symbol intervals, common in-phase and common quadrature-phase components of an error signal that is a measure of the difference between the equalized signal vector that is equalized in one symbol interval and a reference vector which is the equalized signal vector that is equalized in a prior symbol interval, after the latter equalized signal vector is rotated by a phase angle that is proportional to a quantized value of the difference between the phases of the signals equalized during the one and the said prior symbol intervals.

28. The improved method adaptive equalization according to claim 27 wherein the reference vector is the equalized signal vector that is equalized during the symbol interval immediately preceding the said one symbol interval.

29. An adaptive equalizer for a phase-modulated data transmission channel causing distorted signals, comprising:

means providing pairs of output tap signals at synchronously equally time-spaced intervals that are determined by the transmission rate of data symbols transversing the channel, associated tap signals of each pair being in-phase and quadrature-phase tap signals, one of said pair of tap signals being principal tap signals;

means operative during a symbol interval for weighting each pair of tap signals, other than the principal tap signals, with values of associated pairs of in-phase and quadrature-phase tap gains that are updated at least periodically for producing an associated pair of in-phase and an associated pair of quadrature-phase weighted tap signals, wherein each pair of in-phase weighted tap signals is a measure of the associated in-phase tap signal weighted by the associated in-phase tap gain and the associated quadrature-phase tap signal weighted by the associated quadrature-phase tap gain, and wherein each pair of quadrature-phase weighted tap signals is a measure of the associated in-phase tap signal weighted by the associated quadrature-phase tap gain and the associated quadrature-phase tap signal weighted by the associated in-phase tap gain;

means weighting the principal tap signals with constants;

means operative during the symbol interval for combining all of these in-phase and quadrature-phase weighted tap signals, including the weighted principal tap signals, for producing an equalized signal;

means responsive to the output of said last-named combining means for producing, during at least some symbol intervals, common in-phase and common quadrature-phase components of an error signal that is a measure of the difference between the signal vector equalized during one symbol interval and a reference vector which is the signal vector equalized during a prior symbol interval after the latter equalized signal vector is rotated by a phase angle that is proportional to a quantized value of the difference between the phases of the signals equalized during the one and the said prior symbol intervals; and means responsive to pairs of tap signals, other than the principal tap signals, to values of pairs of tap gains and to the in-phase and quadrature-phase error signals for producing associated updated values of in-phase and quadrature-phase tap gains.

30. An adaptive equalizer for a phase-modulated data transmission channel causing distorted signals, comprising:

memory means storing tap signals in associated memory locations, tap signals being arranged in pairs with tap signals being spaced apart in time by synchronously equally spaced time intervals that are determined by the transmission rate of data symbols traversing the channel, the contents of memory locations being advanced periodically, associated tap signals of each pair being in-phase and quadrature-phase tap signals, one of said pair of tap signals being principal tap signals; means weighting each pair of tap signals, other than the principal tap signals, with associated pairs of in-phase and quadrature-phase tap gains, at least some tap gains being updated during at least some symbol intervals, for producing an associated pair of in-phase and an associated pair of quadrature-phase weighted tap signals, wherein each pair of in-phase weighted tap signals is a measure of the associated in-phase tap signal weighted by the associated in-phase tap gain and the associated quadrature-phase tap signal weighted by the associated quadrature-phase tap gain, and wherein each pair of quadrature-phase weighted tap signals is a measure of the associated in-phase tap signal weighted by the associated quadrature-phase tap gain and the associated quadrature-phase tap signal weighted by the associated in-phase tap gain;

means weighting the principal tap signals with constants;

means combining all of these in-phase and quadrature-phase weighted tap signals, including the weighted principal tap signals, for producing an equalized signal;

means responsive to the output of said last-named combining means for producing, during at least some symbol intervals, common in-phase and common quadrature-phase components of an error signal that is a measure of the difference between the signal vector equalized during one symbol interval and a reference vector which is the signal vector equalized during a prior symbol interval after the latter equalized signal vector is rotated by a phase angle that is proportional to a quantized value of the difference between the phases of the signals equalized during the one and said prior symbol intervals; and means producing the tap gains and being responsive to pairs of tap signals, other than the principal tap signals, and to the in-phase and quadrature-phase error signals for producing associated updated values of at least some of the in-phase and quadrature-phase tap gains in at least some symbol intervals.

* * * * *

Page 1 of 5

UNITED STATES PATENT AND TRADEMARK OFFICE
CERTIFICATE OF CORRECTION

PATENT NO. : 3,969,674
DATED : July 13, 1976
INVENTOR(S) : Robert J. Tracey

It is certified that error appears in the above-identified patent and that said Letters Patent are hereby corrected as shown below:

The symbol designations such as $A'_k$, $B'_k$, $AE'_k$, $BE'_k$, $\phi'_k$, $\Delta\phi'_k$, $A'_{k-1}$, $B'_{k-1}$, and $\phi'_{k-1}$ in the drawings (e.g., FIG. 9 on sheet 4) correspond to the symbol designations which appear in the specification and claims as $A'_k$, $B'_k$, $AE'_k$, $BE'_k$, $\phi'_k$, $\Delta\phi'_k$, $A'_{k-1}$, $B'_{k-1}$, $\phi'_{k-1}$, respectively.

Column 1, line 9, change "annd" to -- and --.

Column 2, line 54, change "$c_n$ and $d_n$" to -- $c_{-n}$ and $d_{-n}$ --; and line 56, change "$(k^{th})$" to -- $(k-1^{th})$ --; line 58, delete "B2" and insert therefor -- using new error signals $AE'_k$ and $BE'_k$. These new --; line 63, change "$A'_{k-1}$ and $B'_{k-1}$" to -- $A'_{k-1}$ and $B'_{k-1}$ --; and line 67, change "$\phi'_k - \phi'_{k-1}$" to -- $\phi'_k - \phi'_{k-1}$ --.

Column 3, line 7, change "$(A'_{k-1}, B'_{k-1})$" to -- $(A'_{k-1}, B'_{k-1})$ --; and line 35, after "schematic" insert -- block --.

Column 5, line 48, change "phase" to -- phases --; and line 57, after "scheme" insert -- such --.

UNITED STATES PATENT AND TRADEMARK OFFICE
CERTIFICATE OF CORRECTION

PATENT NO. : 3,969,674
DATED : July 13, 1976
INVENTOR(S) : Robert J. Tracey

It is certified that error appears in the above-identified patent and that said Letters Patent are hereby corrected as shown below:

Column 8, line 13 & 15, in each of the equations (1) & (2) change " $-2^k$ " to -- $-2K$ --; line 19, in equation (4) change "A'k-1" to -- $A'_{k-1}$ --; lines 38 & 39, the phrase "of FIG. 10, where" should be in regular case letters; line 40, change " $c_{++n}$ , $d_{-+n}$ " to -- $c_{-n}$ , $d_{-n}$ --; line 48, change "k_1th" to -- $k-1^{th}$ --; line 51, delete "tap"; and line 52, after "incremental" insert -- tap --.

Column 9, line 12, change "$P_2$" to -- $p_2$ --; line 13, after "$P_1$" insert -- $\angle\alpha$ --; line 20, in equation (7) change "$X_1$" (first occurrence) to -- $X_2$ --; line 26, change "$P_2$" to -- $p_2$ --; line 37, change "transmitted vector $V_1$ " to -- transmitted vector $v_1$ --; and line 61, change "$AF'_k$ " to -- $AE'_k$ --.

Column 10, lines 1 and 11, change "$(AF'_k , BF'_k)$ " to -- $(AE'_k , BE'_k)$ --; lines 12, 13, 15 and 17, change "c_n" to -- $c_{-n}$ --; line 12, change "d_n" to -- $d_{-n}$ --; and line 42, change "phasse" to -- phase --.

Column 11, line 52, change "2n = 1 = 7 " to -- 2n + 1 = 7 --

UNITED STATES PATENT AND TRADEMARK OFFICE
CERTIFICATE OF CORRECTION

PATENT NO. : 3,969,674

DATED : July 13, 1976

INVENTOR(S) : Robert J. Tracey

It is certified that error appears in the above-identified patent and that said Letters Patent are hereby corrected as shown below:

Column 12, line 6, change "as" to -- an --; line 10, change "K-1$^{th}$" to -- k-1$^{th}$ --; line 14, change "The" to -- These --; line 19, change "relates" to -- relate; and line 53, change "k-$^{th}$" to -- k-1$^{th}$ --.

Column 13, line 59, change "K$^{th}$" to -- k$^{th}$ --; and line 70, change "97A$_{+3}$" to -- 98A$_3$ --.

Column 15, line 2, change "B(t" to -- B(t) --; line 13, change "tap line)" to -- tap lines) --; line 15, change "$\theta'_k$ , $\theta_{k-1}$" to -- $\phi'_k$ , $\phi_{k-1}$ --; line 19, delete "0"; line 27, change "So(t)" to -- $S_o(t)$ --; line 42, change "$\phi'_k + {}_k\omega_c T$" to -- $\phi'_k + k\omega_c T$ --; same line 42, change "(kl)" to -- (k-1) --; and line 43, change "$\Delta'_k$" to -- $\Delta\phi'_k$ --.

Column 17, line 29, change "d""" to -- "d" --; and same line 29, delete the period and insert a comma therefor.

Column 18, line 26, change "$\Delta'_k$" to -- $\Delta\phi'_k$ --; line 55, change "B'k$_k$" to -- B'$_k$ --; and line 62, change "$\phi\theta$" to -- $\Delta\theta$ --.

UNITED STATES PATENT AND TRADEMARK OFFICE
CERTIFICATE OF CORRECTION

PATENT NO. : 3,969,674
DATED : July 13, 1976
INVENTOR(S) : Robert J. Tracey

It is certified that error appears in the above-identified patent and that said Letters Patent are hereby corrected as shown below:

Column 20, line 2, change "aer" to -- are --; line 30, change "(tan$^-$1)" to -- (tan$^{-1}$) --; line 31, change "/A'$_k$/B'$_k$/ or /B'$_k$/A'$_k$/" to --|A'$_k$/B'$_k$| or |B'$_k$/A'$_k$| --; line 38, change "started" to -- stated --; and lines 54 and 55, change "tan$^{-1}$ B'$_{k1}$/A'$_{k1}$ and tan$^{-1}$ A'$_{k2}$/B'$_{k2}$" to -- tan$^{-1}$|B'$_{k1}$/A'$_{k1}$| and tan$^{-1}$|A'$_{k2}$/B'$_{k2}$| --.

Column 21, line 22, change "tan$^{-1}$/A'$_k$/B'$_k$/" to -- tan$^{-1}$|A'$_k$/B'$_k$| --; line 29, delete "of tan$^{-1}$" (<u>first occurrence only</u>); same line 29, change "of tan$^{-1}$/B'$_k$/A'$_k$/" to -- of tan$^{-1}$|A'$_k$/B'$_k$| --; line 60, change "K $\omega_c$T" to -- k$\omega_c$T --; and last line 71 there, change "φ'$_k$$^-$1" to -- φ'$_{k-1}$ --

Column 22, line 3, change "K" to -- k --; and line 60, change the second period to a comma.

Column 25, line 33, change "mulitplier" to -- multiplier --

Column 28, line 32, change "C$_o$" to -- c$_o$ --; and line 58, in the equation for $\Delta c_{-n}$, change "I" to -- K --.

UNITED STATES PATENT AND TRADEMARK OFFICE
CERTIFICATE OF CORRECTION

PATENT NO. : 3,969,674
DATED : July 13, 1976
INVENTOR(S) : Robert J. Tracey

It is certified that error appears in the above-identified patent and that said Letters Patent are hereby corrected as shown below:

Column 29, line 2, change "K-1$^{th}$)" to -- (k-1$^{th}$) --; line 8, change "$AE_k$" to -- $AE'_k$ --; line 12, delete "and produces"; delete line 13; line 14, delete "bol intervals,"; and line 24, change "$\Delta d_n$" to -- $\Delta d_{-n}$ --.

Column 34, line 3, a new paragraph should start with the word "means".

Signed and Sealed this

Twenty-fifth Day of October 1977

[SEAL]

Attest:

RUTH C. MASON
Attesting Officer

LUTRELLE F. PARKER
Acting Commissioner of Patents and Trademarks